US012341562B2

(12) United States Patent
Krogen

(10) Patent No.: US 12,341,562 B2
(45) Date of Patent: Jun. 24, 2025

(54) CASCADED OPTICAL PULSE DISTRIBUTION NETWORK FOR GENERATION OF REPLICATED OPTICAL PULSES

(71) Applicant: PsiQuantum Corp., Palo Alto, CA (US)

(72) Inventor: Peter Krogen, Sierra Madre, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 0 days.

(21) Appl. No.: 18/860,806

(22) PCT Filed: Apr. 28, 2023

(86) PCT No.: PCT/US2023/020416
§ 371 (c)(1),
(2) Date: Oct. 28, 2024

(87) PCT Pub. No.: WO2024/072487
PCT Pub. Date: Apr. 4, 2024

(65) Prior Publication Data
US 2025/0112708 A1    Apr. 3, 2025

Related U.S. Application Data

(60) Provisional application No. 63/363,745, filed on Apr. 28, 2022.

(51) Int. Cl.
*H04B 10/70* (2013.01)
*G02F 1/35* (2006.01)
(Continued)

(52) U.S. Cl.
CPC ........... *H04B 10/70* (2013.01); *G02F 1/3536* (2013.01); *G02F 1/39* (2013.01); *H04B 10/25* (2013.01)

(58) Field of Classification Search
CPC ....... H04B 10/70; H04B 10/25; G02F 1/3536; G02F 1/39
See application file for complete search history.

(56) References Cited

U.S. PATENT DOCUMENTS 8,441,383 B1 * 5/2013 Morgan .................... G02F 7/00
341/137
8,569,675 B1 * 10/2013 Yap ......................... H01S 5/041
250/214 R (Continued)

FOREIGN PATENT DOCUMENTS

| WO | WO2021202445 A1 | 10/2021 |
| WO | WO2021202853 A1 | 10/2021 |
| WO | WO2023172720 A1 | 9/2023 |

OTHER PUBLICATIONS

Muhammad Imran et al., "A Survey of Optical Carrier Generation Techniques for Terabit Capacity Elastic Optical Networks," Nov. 17, 2017, IEEE Communications Surveys & Tutorials, vol. 20, No. 1, First Quarter 2018, pp. 211-249.*

(Continued)

*Primary Examiner* — Omar S Ismail
(74) *Attorney, Agent, or Firm* — THE MARBURY LAW GROUP PLLC

(57) ABSTRACT

In some implementations, a cascaded optical network includes a pump laser source, a network input channel configured to receive an input optical signal from the pump laser source, a plurality of n-way amplifier/splitter modules configured in m stages to generate $n^m$ output optical signals from the single input optical signal, where each of $n^j$ output optical signals in a given j'th stage are fed as input to $n^j$ amplifier/splitter modules in a (j+1)'th stage, where n and m are each integers greater than 1 and j ranges from 1 to m, $n^m$ output channels that are configured to provide the $n^m$ output signals as output from the cascaded network of amplifier/

(Continued)

splitter modules, and a plurality of heralded single photon sources configured to receive the $n^m$ output optical signals from the n-way amplifier/splitter modules in the m'th stage.

20 Claims, 26 Drawing Sheets

(51) Int. Cl.
    *G02F 1/39*     (2006.01)
    *H04B 10/25*     (2013.01)

(56) References Cited

U.S. PATENT DOCUMENTS

| | | | | |
|---|---|---|---|---|
| 11,502,758 | B2* | 11/2022 | Bucklew | H04B 10/6166 |
| 2005/0047788 | A1* | 3/2005 | Miyazaki | H04B 10/299 |
| | | | | 398/85 |
| 2006/0187974 | A1 | 8/2006 | Dantus | |
| 2007/0248136 | A1 | 10/2007 | Leonardo et al. | |
| 2008/0225904 | A1* | 9/2008 | Brown | H01S 3/225 |
| | | | | 372/25 |
| 2009/0067468 | A1* | 3/2009 | Brown | H01S 3/2325 |
| | | | | 372/55 |
| 2009/0072811 | A1* | 3/2009 | Marciante | G01R 29/027 |
| | | | | 324/76.12 |
| 2009/0296755 | A1* | 12/2009 | Brown | H01S 3/225 |
| | | | | 372/57 |
| 2010/0142573 | A1* | 6/2010 | Minden | H01S 3/2383 |
| | | | | 372/29.016 |
| 2010/0259440 | A1* | 10/2010 | Li | G01S 7/415 |
| | | | | 342/99 |
| 2013/0250982 | A1 | 9/2013 | Zhang et al. | |
| 2019/0250253 | A1 | 8/2019 | Hung et al. | |
| 2020/0251876 | A1 | 8/2020 | Bhawalker et al. | |
| 2020/0303893 | A1 | 9/2020 | Yusim et al. | |
| 2021/0278595 | A1 | 9/2021 | Kumar | |
| 2021/0278738 | A1 | 9/2021 | Kumar | |
| 2023/0020416 | A1 | 1/2023 | Graham et al. | |

OTHER PUBLICATIONS

Benjamin Wetzel et al., "Customizing supercontinuum generation via onchip adaptive temporal pulse-splitting," Nov. 20, 2018, Nature Communications, (2018), Article 9,4884, pp. 1-6.*

Rosa Weigand et al., "Fundamentals of Highly Non-Degenerate Cascaded Four-Wave Mixing," Sep. 7, 2015, Applied Science, 2015, p. 486-510.*

Kan Tian et al., "Mid-Infrared Few-Cycle Pulse Generation and Amplification," Jul. 21, 2021, Photonics 2021,8,290, pp. 1-20.*

IPRP-WO—Notification Concerning Transmittal of Copy of International Preliminary Report on Patentability and Written Opinion of the International Searching Authority for International Patent Application No. PCT/US2023/020416, dated Nov. 7, 2024, 9 pages.

ISA—Invitation to Pay Additional Fees and Where Applicable, Protest Fee from International Search Authority or International Patent Application No. PCT/US2023/020416, dated Apr. 8, 2024, 2 pages.

ISR-WO—International Search Report and Written Opinion of the International Searching Authority for International Patent Application No. PCT/US2023/020416, dated May 28, 2024, 12 pages.

Licausi, N. et al., "BTO Phase Shifter and Method of Fabrication Thereof," U.S. Appl. No. 18/845,679, filed Sep. 10, 2024.

Thorlabs, "PN1550R1A1—1×2 PM Coupler, 1550±15 nm, 99:1 Split, ≥20 dB Per, FC/APC Connectors," Release dated Mar. 25, 2016, 2pages, https://www.thorlabs.com/thorproduct.cfm?partnumber=PN1550R1A1, viewed on Oct. 28, 2024.

\* cited by examiner

CASCADED OPTICAL PULSE DISTRIBUTION NETWORK FOR GENERATION OF REPLICATED OPTICAL PULSES

PRIORITY

This application claims the benefit of priority from U.S. Provisional Application Ser. No. 63/363,745, filed on Apr. 28, 2022, which is incorporated herein by reference in its entirety.

TECHNICAL FIELD

The present disclosure generally relates to optical devices, and more particularly to optical pulse systems.

BACKGROUND

Some optical systems use optical pulses to implement processing. An optical pulse is a short beam or flash of light that can be produced by a light source, such as a light emitting diode or laser. Some optical systems have stringent operational parameters that are designed to function with highly similar or identical input pulses. Example systems that can implement highly similar or identical input pulses include high-precision timing systems and quantum information processing systems (e.g., quantum computers, quantum-based networks).

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Figure 1A:
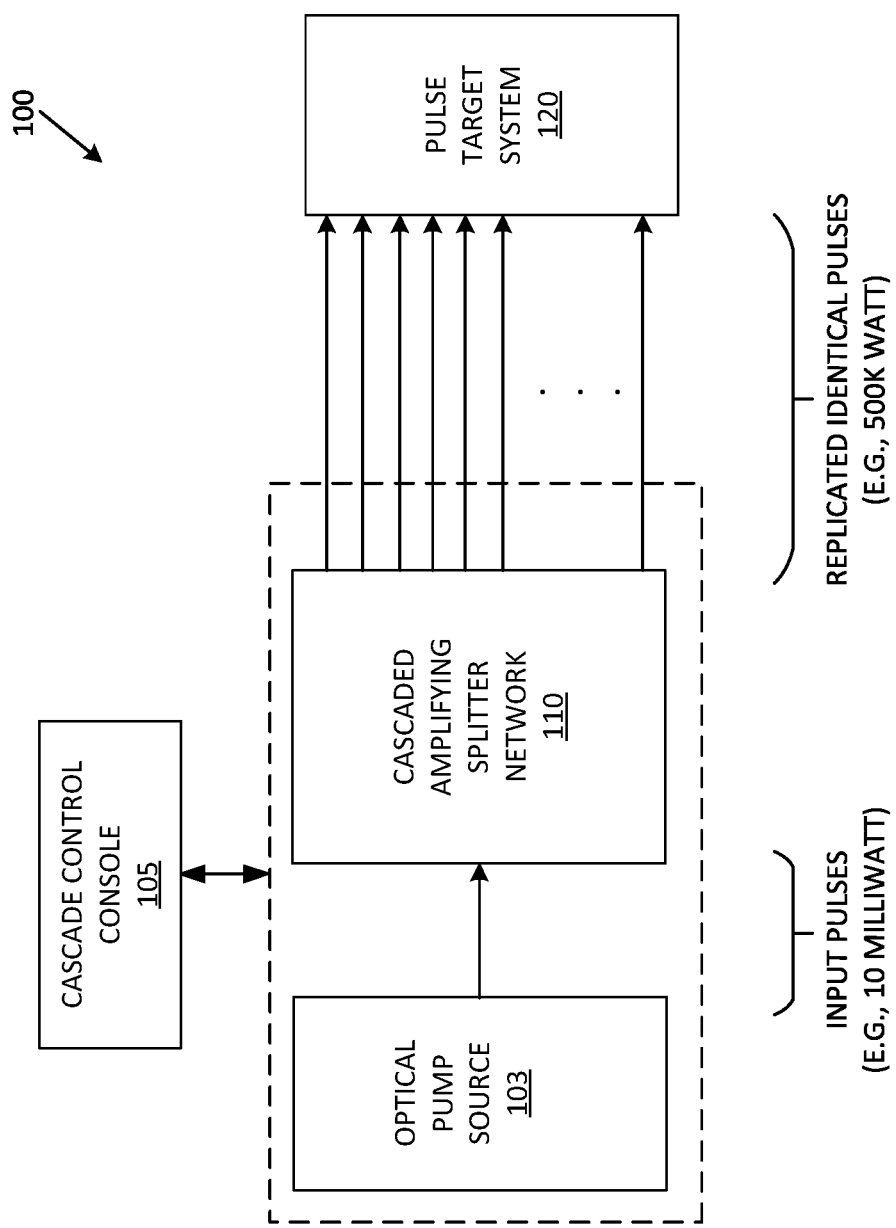
FIG. 1A shows a cascaded optical pump splitter system, in accordance with some example embodiments.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

Systems configured to perform optical quantum computing operations may include a plurality of optical sources that generate optical pulses that may be used to drive a respective plurality of heralded single photon sources. Single photons generated by the heralded single photon sources may then be used to encode data that may be processed using quantum logic gates to perform quantum computing operations. Despite many efforts in the field of optical quantum computing, there remain many challenges related to the generation of optical pulses having appropriate characteristics to be reliably used to drive heralded single photon sources for quantum computing operations.

An embodiment cascaded optical network includes a pump laser source, a network input channel configured to receive an input optical signal from the pump laser source, a plurality of n-way amplifier/splitter modules configured in m stages to generate $n^m$ output optical signals from the single input optical signal, where each of $n^j$ output optical signals in a given j'th stage are fed as input to $n^j$ amplifier/splitter modules in a (j+1)'th stage, where n and m are each integers greater than 1 and j ranges from 1 to m, $n^m$ output channels that are configured to provide the $n^m$ output signals as output from the cascaded network of amplifier/splitter modules, and a plurality of heralded single photon sources configured to receive the $n^m$ output optical signals from the n-way amplifier/splitter modules in the m'th stage.

In another embodiment, an optical amplifier/splitter module includes an input channel configured to receive an input optical signal, an optical pre-amplifier configured to amplify the input optical signal to generate an amplified input signal, an n-way beam splitter configured to receive the amplified input signal and to generate n copies of the amplified input signal, wherein n is an integer greater than 1, n optical tailoring modules configured to receive the respective n copies of the amplified input signal to generate n output signals, and n output channels configured to provide the n output signals as output from the optical amplifier/splitter module to at least one heralded single photon source.

A method includes receiving an input optical signal by a cascaded network of amplifier/splitter modules, using a plurality of n-way amplifier/splitter modules in m stages to split the input signal into $n^m$ output optical signals, wherein each of a $n^j$ output optical signals in a given j'th stage are fed as input to $n^j$ amplifier/splitter modules in a (j+1)'th stage, wherein n and m are each integers greater than 1 and j ranges from 1 to m, and providing the $n^m$ output optical signals as output from the cascaded network of amplifier/splitter modules to a plurality of heralded single photon sources which receive the $n^m$ output optical signals from the n-way amplifier/splitter modules in the m'th stage.

In one embodiment, the output optical signals from the n-way amplifier/splitter modules in the first stage to the (m−1) stage are provided to other ones of the n-way amplifier/splitter modules in a next higher numbered stage.

In some example embodiments, the active photonic devices described implement electro-optic effects, such as free carrier induced refractive index variation in semiconductors, the Pockels effect, and/or the DC Kerr effect to implement modulation and/or switching of optical signals. Embodiments of this disclosure are applicable to both modulators, in which the transmitted light is modulated either ON or OFF, or light is modulated with a partial change in transmission percentage, as well as optical switches, in which the transmitted light is output on a first output (e.g., waveguide) or a second output (e.g., waveguide) or an optical switch with more than two outputs, as well as more than one input. Thus, embodiments of this disclosure are applicable to a variety of designs including an M(input)×N (output) systems that utilize the methods, devices, and techniques discussed herein. Some embodiments also relate to electro-optic phase shifter devices, also referred to herein as phase adjustment sections, that may be employed within switches or modulators. In some example embodiments, the phase shifting is managed using thermo-optic phase shifters, which implement resistive heating elements to change the index of the waveguide and thereby induce controllable phase shifts.

FIG. 1A shows a cascaded optical pump splitter system 100, in accordance with some example embodiments. In the example illustrated, an optical pump source 103 generates a sequence of optical pulses for replication by a cascaded amplifying splitter network 110 for coupling to a pulse target system 120. In some example embodiments, the optical pump source 103 comprises a pumped laser (e.g., Yttrium pumped laser at 1000 nanometer, erbium pumped laser at 1550 nanometer) that generates optical pulses that undergo pulse shaping to generate a pulse for replication. Pulse shaping comprises changing a parameter of an optical pulse, where the parameters can include one or more of: pulse duration, pulse power, pulse frequency, and so on.

Figure 1B:
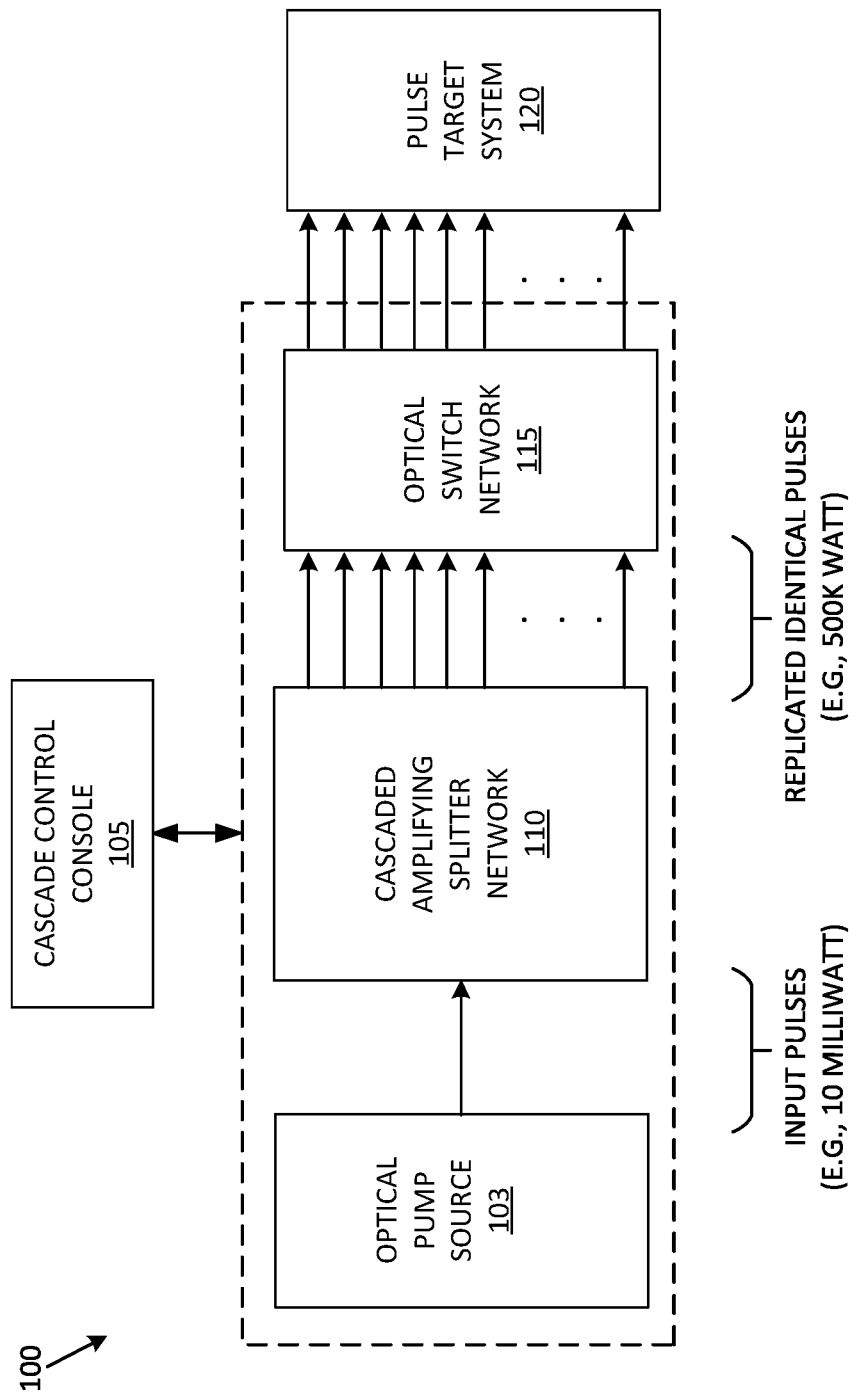
FIG. 1B shows the cascaded optical pump splitter system with an optical switch network, in accordance with some example embodiments.

In the example illustrated in FIGS. 1A and 1B, the cascaded amplifying splitter network 110 comprises a plurality of amplifying optical splitter nodes (e.g., FIG. 3, FIG. 5) that amplify the pulses and split the pulses onto a plurality of channels (e.g., 1 to N channels). Each channel comprises optical tailoring components that compensate for loss of the channel along the entire path (e.g., adjust for loss along a given channel path through the cascaded amplifying splitter network 110). The optical tailoring components can further apply adjustments to channels based on the pulse of the channel requiring delay, further amplification, polarization modification, or filtering to ensure that the output pulses of a given amplifying splitter are not degraded relative to the pulse received by the given amplifying splitter. The pulse target system 120 comprises a system that is designed to use the replicated identical pulses for further optical processing, as further discussed with reference to FIGS. 11-14 below.

As a brief example, the processing components of the pulse target system 120 may be designed to operate on the basis that pulses from a given replication node are highly similar or identical to pulses from other replicated nodes. For instance, the pulse target system can comprise a plurality of network clocks (FIG. 13) that are configured to receive replicated pulses of the same type and at the same time for network synchronization purposes. As an additional example, the pulse target system 120 can be a photonic quantum information processing system (e.g., FIG. 11, FIG. 12) that is configured to receive optical pulses to generate photon pairs (e.g., signal and idler photons) having identical properties (e.g., all the idler photons are highly similar or identical and entangle-able with one another).

In some example embodiments, the outputs of the cascaded amplifying splitter network 110 are directly connected to the pulse target system 120 using one or more optical interconnects (e.g., optical fiber, fiber coupling components, grating, lenses). In some example embodiments, the lengths of the interconnects (e.g., fiber) of a given channel is configured to ensure the optical pulses all arrive at the same time at the pulse target system 120. In some example embodiments, the output of a final or last replication node is direct connected via fiber to a nearest target system component. For example, the pulse target system 120 may comprise a plurality of processing nodes (e.g., single photon source cards or racks) and sets of outputs from a set of last replication nodes of the cascaded optical pump splitter system 100 are coupled via fiber to the nearest processing nodes of the pulse target system 120.

Further illustrated in FIG. 1A is a control console 105 (e.g., FIG. 18) that has a data interface to the components in the cascaded optical pump splitter system 100. The control console 105 can implement calibration of the cascaded optical pump splitter system 100 and monitor performance of the cascaded optical pump splitter system 100 to address issues or errors as they arise in the system, as discussed in further detail below.

FIG. 1B shows the cascaded optical pump splitter system 100 with the addition of an optical switch network 115, in accordance with some example embodiments. In the example of FIG. 1B, the outputs of the cascaded amplifying splitter network 110 are output to a switch network which is configured to route the optical pulses to a given component of the pulse target system 120 that is nearest the node that is outputting the particular optical pulses. In some example embodiments, the optical switch network 115 comprises a plurality of optical switches and delays to maintain the syncing of the output replicated pulses while routing the output replicated pulses to components of the pulse target system 120.

Figure 2:
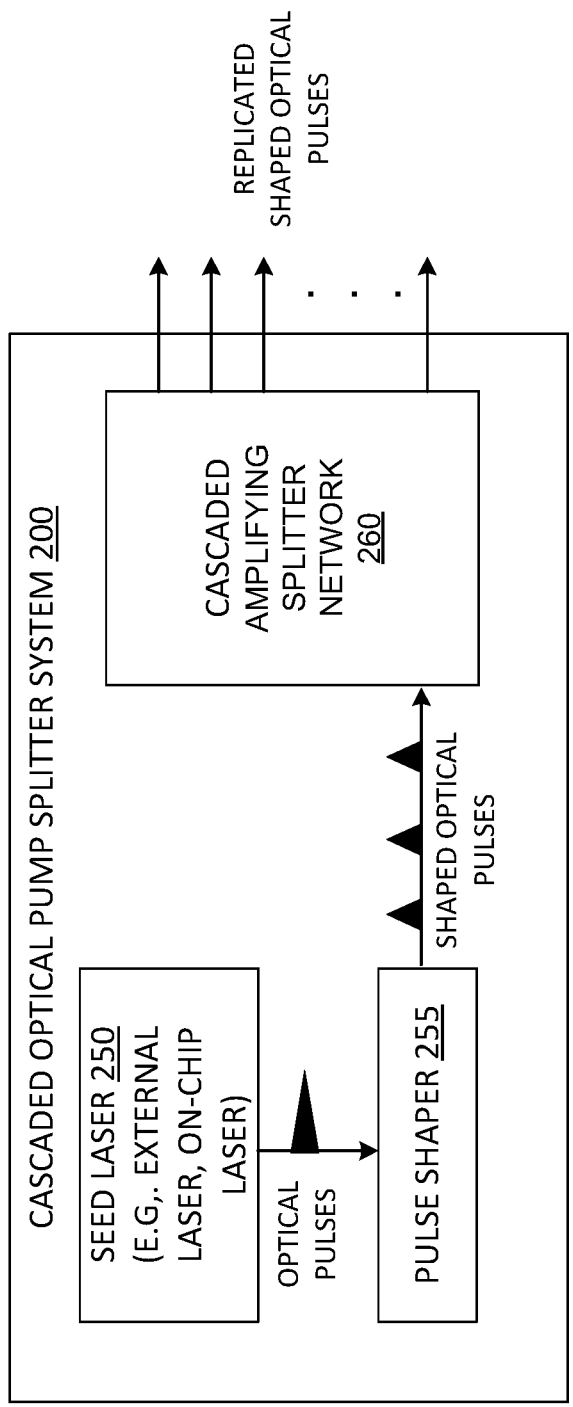
FIG. 2 shows a cascaded optical pump splitter system, in accordance with some example embodiments.

FIG. 2 shows an example of a cascaded optical pump splitter system 200, in accordance with some example embodiments. In accordance with some example embodiments, the cascaded optical pump splitter system 200 comprises a seed laser 250 such as an external fiber doped rare earth laser or an on-chip photonic integrated circuit (PIC) laser that generates the initial optical pulses. Further illustrated in FIG. 2 is a pulse shaper 255 that is configured to change the pulse shape from the initial shape to form shaped optical pulses. In some example embodiments, the pulse shaper 255 is a discrete external system (e.g., off the shelf pulse shaper, such as benchtop programmable optical filter) into which an input fiber inputs one or more pulses, which are then shaped by filters in the pulse shaper and then output to one or more output fibers. In some example embodiments, a pulse shaper is a conduit that can be mounted on a rack or card (e.g., in a card managed in a server tower, as discussed in FIG. 7), such as a Dazzler™ Ultrafast Pulse shaper.

In some example embodiments, the pulse shaper 255 is implemented to impart dispersion compensation to the shaped optical pulses to ensure the replicated pulses are in the desired form (e.g., shape, power, wavelength, bandwidth) for successful processing by the target system (e.g., target system 120, not depicted in FIG. 2). The shaped optical pulses are then replicated from a single input channel to a higher order of output channels (e.g., 200,000 to 1,000,000) by a plurality of replication nodes in the cascaded amplifying splitter network 260.

Figure 3:
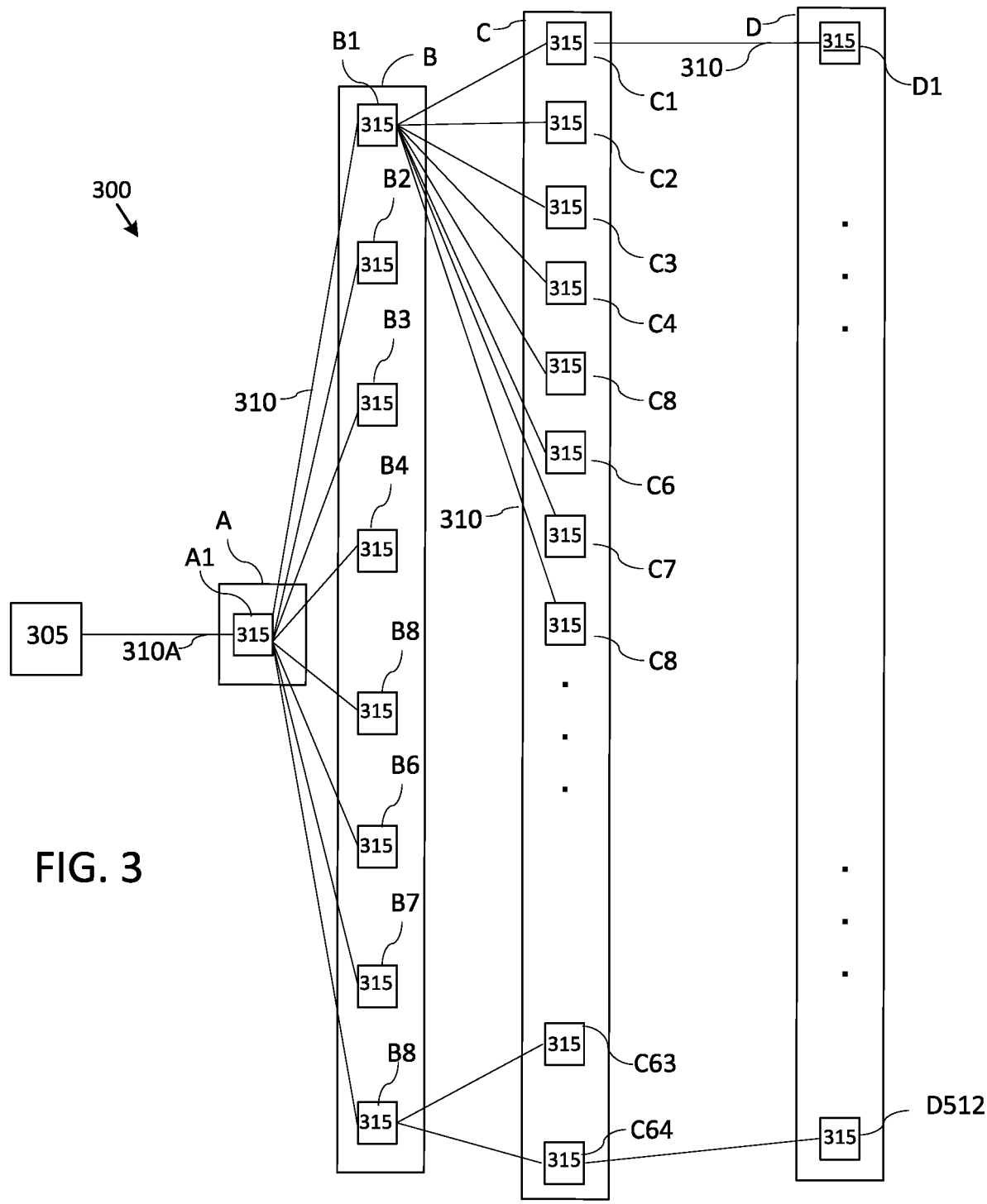
FIG. 3 is a schematic illustration of a cascaded amplifying splitter network, in accordance with some example embodiments.

FIG. 3 is a schematic illustration of a cascaded amplifying splitter network 300 (e.g., cascaded amplifying splitter network 110, cascaded amplifying splitter network 260) of blocks or stages of amplifying splitter modules 315 ("ASM", e.g., replication nodes), according to some embodiments. As shown, a first ASM A1 in the first block A is configured to receive a single input optical pulse (e.g., from optical pump source 103, seed laser 250, on chip laser) via an input channel 310A and to generate eight copies of the input optical pulse. Each of the eight copies of the input pulse may be coupled via optical fibers 310 as input pulses to eight respective second cascaded ASMs in the second block B. In this example, the eight second cascaded ASM's may be labeled B1, B2, B3, B4, B5, B5, B7, and B8, as shown. The eight second cascaded ASM's B1-B8 receive a single copy of the input pulse (e.g., replicated optical pulse) and generate eight additional copies. The eight additional copies of the input pulses generated by each of the eight second cascaded ASM's B1-B8 in the second block B are coupled as input pulses to 64 respective third cascaded ASMs C1-C64 in the third block C. The process may be continued, with the eight output pulses from each of the third cascaded ASM's C1-C64 being coupled as input pulses to 512 respective fourth cascaded ASMs D1-D512 in block D. This process may be continued to generate as many pulse sources as required to drive a respective number of components in a target system (e.g., FIGS. 12-15). One of ordinary skill in the art appreciates that as used in these examples, the term "block" is used to describe the stage of the branches of the cascaded network of ASMs 315, rather than structural features of the network.

Figure 4:
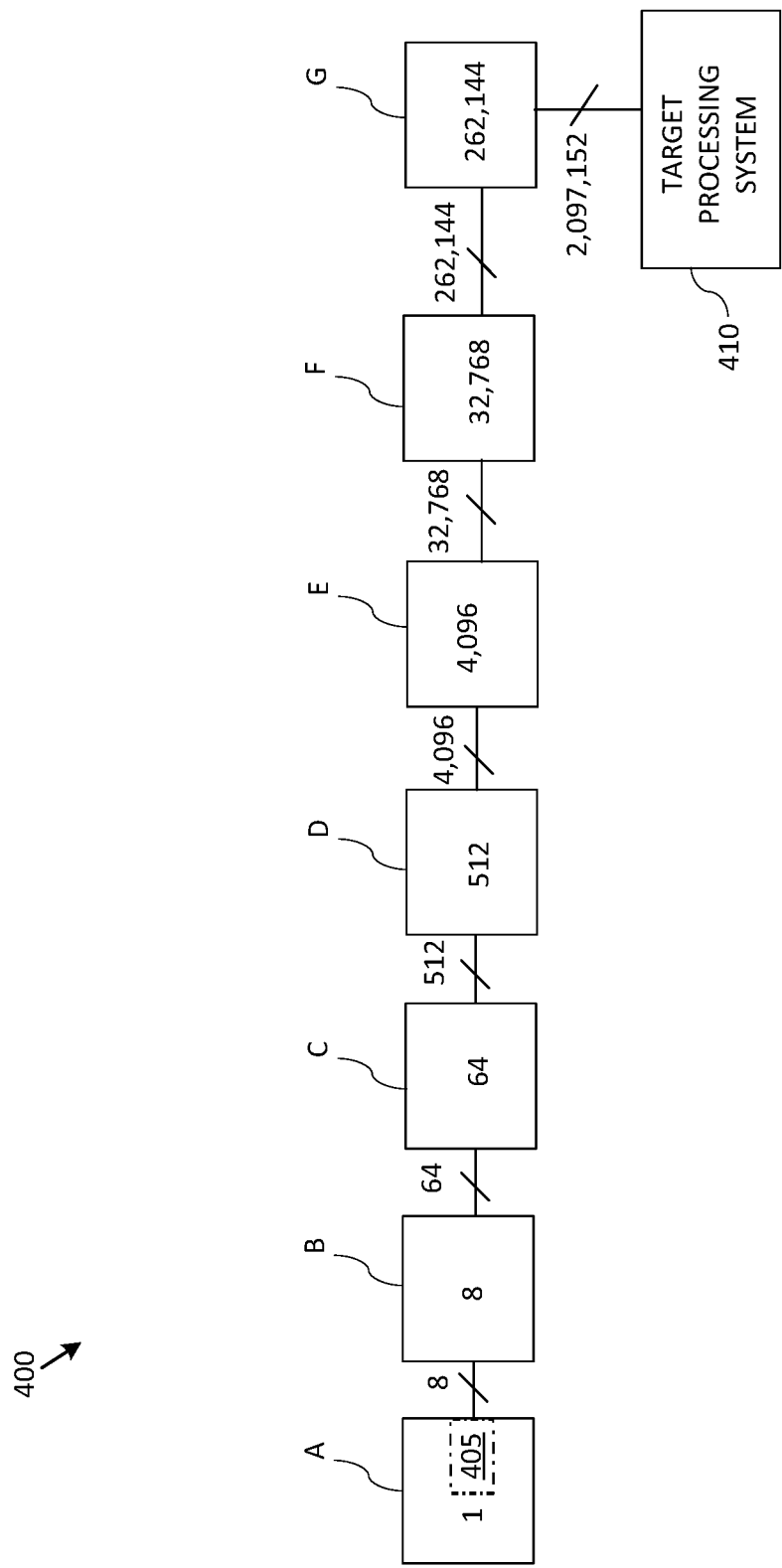
FIG. 4 is a block diagram of a cascaded splitter network showing increasing channel count over several levels, in accordance with some example embodiments.

FIG. 4 is a block diagram of a cascaded splitter network 400 of amplifying splitter modules that generate optical pulses that are replicas of an initial optical pulse, according to some embodiments. In the first block A, a first ASM 405 (e.g., A1 in FIG. 3, replication node 600 in FIG. 6A) receives a single input pulse and generates eight output pulses (indicated in FIG. 4 with a horizontal line and tilted crossed line with "8" to indicate channel count).

In the second block B, eight ASMs receive the respective eight input pulses that are generated and output by the first block A. The eight ASMs then generate 64 output pulses. In the third block C, 64 ASMs receive the respective 64 input pulses generated and output by the second block B. The 64 ASMs then generate 512 output pulses. In block D, the 512 output pulses generated in block C are received by 512 ASMs (e.g., 512 server rack cards) that generate 4,096 output pulses. In block E, the 4096 output pulses from block D are received by 4096 ASMs that, in turn, generate 62,768 output pulses. In block F, the 62,768 output pulses from block E are received by 62,768 respective ASMs that, in turn, generate 262,144 output pulses, which can then be output to a target device or further coupled to additional layers of ASMs (e.g., G block) for further replication and higher channel count (e.g., seven blocks to generate one million or more output pulses to drive a million or more target devices (e.g., photon pair sources).

In some example embodiments, the cascaded splitter network 400 receives pulses from a pump laser source, and the splitter network 500 includes a a network input channel 310A configured to receive an input optical signal from the pump laser source. In some example embodiments, the splitter network 400 further comprises a plurality of n-way amplifying splitter modules (e.g., module 315) configured in m stages (e.g., blocks A to G) to generate $n^m$ output optical signals from the single input optical signal, where each of $n^j$ output optical signals in a given j'th stage are fed as input to $n^j$ amplifying splitter modules 800 in a (j+1)'th stage, where n and m are each integers greater than 1 and j ranges from 1 to m, $n^m$ output channels that are configured to provide the $n^m$ output signals as output from the cascaded network of amplifying splitter modules 315, and a plurality of heralded single photon sources configured to receive the $n^m$ output optical signals from the n-way amplifier/splitter modules in the m'th stage (e.g., from the amplifying splitter modules 315 in an example block or stage "G"). In some example embodiments, the output optical signals from the n-way amplifying splitter modules in the first stage "A" to the (m−1) stage "F" are provided to other ones of the n-way amplifier/splitter modules 315 in a next higher numbered stage (e.g., in the respective stages/blocks "B" through "G").

Figure 5:
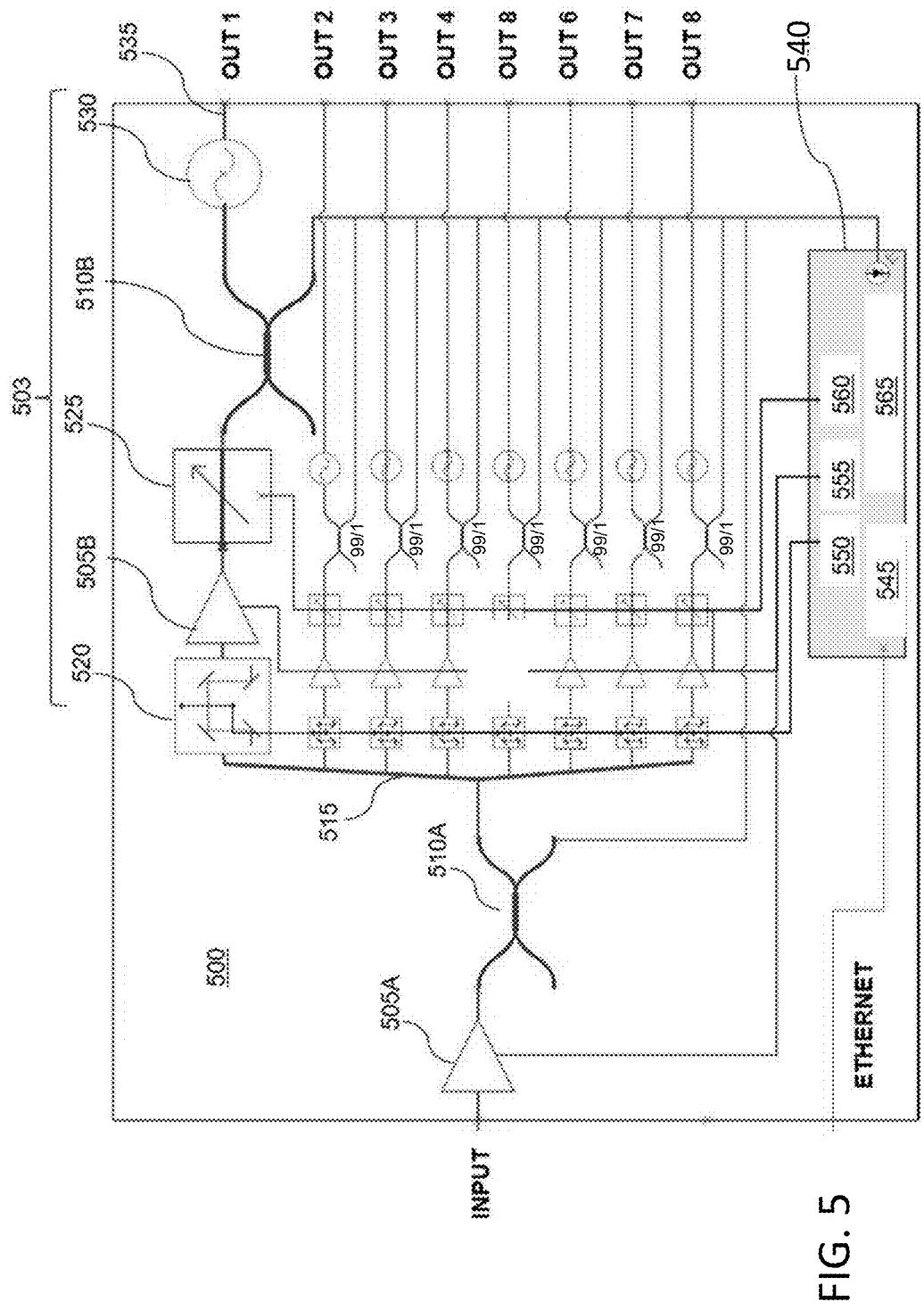
FIG. 5 is schematic illustration of components of the amplifying splitter module, in accordance with some example embodiments.
Figure 5:
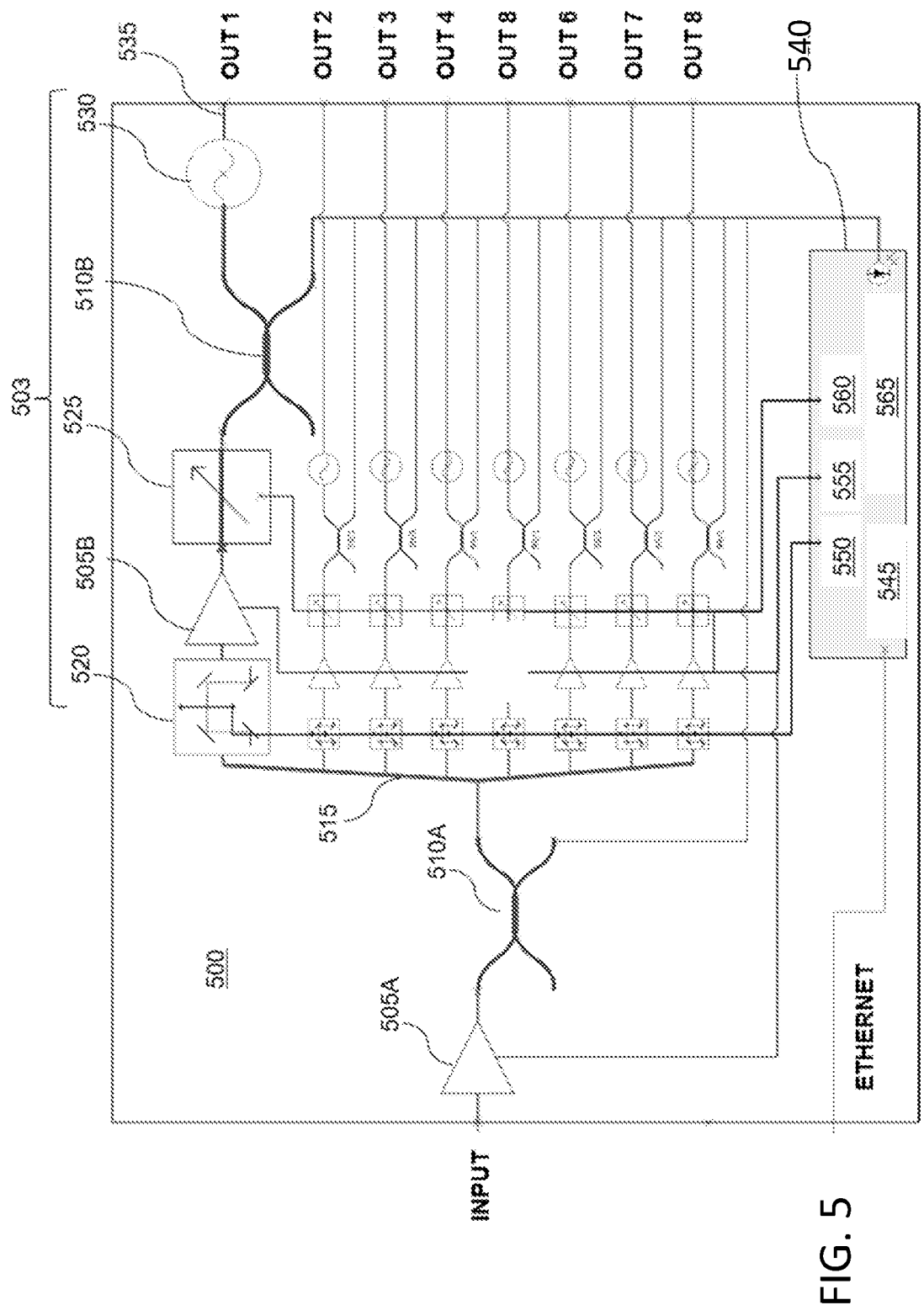

FIG. 5 is schematic illustration of components of the amplifying splitter module 500, according to some embodiments. In this example, the amplifying splitter module 500 has an 8-way configuration that takes a single input pulse, "INPUT" (e.g., single fiber input from the pulse shaper 255) and generates n copies, such as 8 copies ("OUT 1"-"OUT 8") in one embodiment. In other embodiments, n may be any integer greater than 1, such as 2 to 62 for example. The amplifying splitter module 500 includes a respective optical tailoring module 503 (e.g., channel shaper 615, FIG. 6) for each output channel (e.g., for each output optical fiber) 535, such that there are n modules 503 for n respective output fibers 535. Thus, the amplifying splitter module 500 may include n (e.g., eight) optical tailoring modules 503 each containing an optical amplifier 505B for each output optical fiber 535. The amplifying splitter module 500 may also include an optional optical pre-amplifier 505A, a first optical power monitor tap 510A, and n-way (e.g., 8-way) optical beam splitter 515. The pre-amplifier and the amplifiers may comprise any suitable optical amplifiers, such as an ytterbium or erbium doped amplifier (e.g., fiber amplifier, integrated optically pumped amplifier). In some example embodiments, other rare earth fiber amplifiers (e.g., rare earth ion doped silicon oxide optical fibers) or semiconductor optical amplifiers (e.g., GaAs based quantum well optical amplifiers) may be used instead. In some example embodiments, the fiber amplifiers are operated at saturation. Due to the optical characteristics of the materials of the fiber amplifier (e.g., ytterbium, erbium), operating the fiber amplifiers at saturation across the cascade suppress noise from the cascade (e.g., in contrast to semiconductor optical amplifiers which can add noise when cascaded and/or operated at saturation).

In one embodiment, each of the optical tailoring modules 503 may include an optical delay line, such as optical delay line 808, the optical amplifier 505B, a variable optical attenuator 525, and a second power monitor tap 510B. In some example embodiments, additional components are implemented on each arm. For example, each optical tailoring module 503 may further include an optional spectral control filter 530 and/or a polarization control component for management of polarization of the pulses (e.g., in embodiments where polarization maintaining fibers and components are not implemented). In some example embodiments, the polarization control components comprise off-chip fiber-based polarization control components in which the stress induced birefringence is used to modify the polarization of the light in fiber (e.g., implements the effects of stress-induced birefringence to create changes in the polarization of light traveling through the fiber under stress (e.g., bending from/caused by piezo)). In some example embodiments, the polarization control components are implemented as on-chip components as are known in the art. An example on chip polarization controller can include a direct couple having gratings on the sides of the waveguides in the direct coupler that suppress one type of polarization (TE polarized light) and pass another type of polarized light (TM).

In FIG. 5, the components of the first optical tailoring module 503 for the first output channel 535 are enlarged for clarity of illustration but should be assumed to be similar to components of the second through eighth optical tailoring modules 503 for the respective second through eighth output channels 535.

The power monitor taps 510A and 510B may comprise any suitable optical splitters, such as 99:1 optical splitters (e.g., directional couplers, MMIs). The 1% output of the splitter may be provided to the control electronics module 540, while the 99% output of the splitter may be provided to the respective output channel 535. In some example embodiments, the optical delay lines are implemented from components such as beam splitter(s), mirrors(s) (e.g., in which optical pulses are sent through air between optical components with a variable path length); in some example embodiments, the optical delays are formed from long waveguide paths that spiral or meander to delay. In some example embodiments, a photonic integrated circuit comprises a set of delay paths of increasing amounts of delays (e.g., increased lengths, spirals), and to delay a given arm, the delay of the given arm implements an switch (e.g., MZI) to direct the light onto one of the given delay paths for optical delay of the replicated pulse.

The variable optical attenuator 525 may comprise any suitable attenuator to cause loss of a shaped pulse on that channel. Example attenuators include a step-wise variable or continuously variable attenuator, which uses absorption, reflection, diffusion, scattering, deflection, diffraction, and/or dispersion for attenuation of the optical pulses. Any suitable optical filters 530 may be used, such as absorption, interference and/or dichroic filters. In some example embodiments, the optical filters are optional or integrated into the amplifiers to remove or attenuate wavelengths away from the center wavelength of the seed pulse, thereby reshaping the pulse after amplification. In some example embodiments, the components may be interconnected with polarization maintaining single-mode optical fiber with lengths selected to ensure consistent arrival time of the optical pulses at the optical target device.

Each module (e.g., optical channel) 503 may be controlled/monitored by a control electronics module 540, which may be configured to allow system-wide control/monitoring of the network. In this example embodiment, an ethernet interface 545 may be provided to allow easy remote monitoring/control of the system from a central processor (e.g., central computer). The control electronics module 540 (e.g., ASIC, microcontroller, CPU/memory) may include a delay controller 550 which controls the delay lines 520, an amplifier controller 820 which controls the amplifiers 505A and 505B, an attenuator controller 560 which controls the attenuators 525, and an optical power monitor 565 connected to the output of the optical taps 510A and 510B.

In some example embodiments, the amplifying splitter module 500 operates as follows. The input pulse (e.g., a laser radiation pulse) is provided via an optical fiber to the pre-amplifier 505A where the input pulse is amplified. The output of the pre-amplifier 505A is monitored by the amplifier controller 555 via the first power monitor tap 510A. The pre-amplified input pulse is then split n ways (e.g., 8 ways) by the optical beam splitter 515 (e.g., fiber splitter, waveguide splitter, tree of waveguide Y-junctions). Each split portion of the input pulse is provided to the respective optical tailoring module 503. In the optical tailoring module 503, the delay line 520 controls the arrival time of the optical pulse at the output channel 535. The optical amplifier 505B then amplifies the optical pulse to offset the optical losses in the amplifying splitter module 500. The variable optical attenuator 525 fine tunes the optical pulse beam characteristics. The second power monitor tap 510B provides a portion of the output optical pulse exiting the attenuator 525 to the control electronics module 540 before it reaches the output channel (e.g., output fiber 535).

Other embodiments may include various alternative configurations. For example, individual laser driver sources may be provided for each source module. Such individual laser driver sources may be implemented as integrated photonic laser sources. Other embodiments may include single photon sources that do not require an optical drive signal. Within embodiments using cascaded amplifying splitter modules, there may be various alternative configurations that may be implemented. For example, various technologies may be used to guide the optical signals (e.g., fiber-based, integrated photonic-based, or free-space-based configurations). The above-described embodiments utilize a fiber-based approach.

Alternatives may include integrated photonic approach to guide optical signals. Similarly, various technologies may be used to amplify the optical signals (e.g., rare earth doped fiber-based or semiconductor-based configurations). The above-described embodiments may use rare earth doped fibers, but semiconductor amplifiers (e.g., waveguide integrated GaAs quantum well amplifiers) or integrated photonic rare earth doped amplifiers may also be used. Various different technologies may be used to split the light (e.g., fiber-based, integrated photonic-based, or free-space-based configurations). The above-described embodiments use fiber-based splitters, but integrated-photonic and free-space designs may be readily applicable.

In some example embodiments, the waveguides and fibers of the node 500 are polarization maintaining components to ensure a pulse of a given channel maintains its polarization orientation as it is replicated in its channel. In some example embodiments, the channels are configured with polarization agnostic components (e.g., SMF fiber, that propagate different polarizations); in those embodiments, each arm in the tailoring section 503 additionally includes an optical polarization component to determine (e.g., via controller 540) the polarization of the pulse in the channel and a polarization modification component modify the polarization to maintain the polarization of the pulse as it propagates through the channels. Further, as discussed below, in some example embodiments, the computational control of the nodes in the cascaded amplifying splitter network 110 is distributed across the nodes (e.g., distributed control assigned to ASICs or microcontrollers in each node, microcontroller 540). For example, the local controllers for each node can be linked directly one another to form nodes that can perform control operations using distributed computing methods (e.g., gossip protocol-based control) and/or be additionally configured (via instructions in local node memory) to instruct neighboring nodes of issues or control instructions if certain conditions are identified. For instance, a node can deactivate if it determines its components are no longer correctly functioning, and the controller of the node can set a timer to deactivate itself and transmit instructions to other propagated to nodes (of child channels, child nodes) to deactivate to avoid propagation of faulty pulses. As an additional example, if a replication node identifies a temperature increase (e.g., due to local environment heating up, the server tower heating up, once side of a data center building being hotter) the node can transmit transmit detection of the increased temperature to nearby physical nodes. In some example embodiments, the replication nodes perform actions by implementing a consensus protocol. For instance, a threshold can be set whereby if a group of nodes in a given physical area (e.g., in a server tower) each detect a similar increase in temperature that all of the nodes in the physical area should perform an adjustment to maintain quality of the output pulse (e.g., all the nodes in the physical area governed by the consensus increase their amplification, increase loss, change polarization, or other actions to maintain the same replicated pulse characteristics.

Figure 6A:
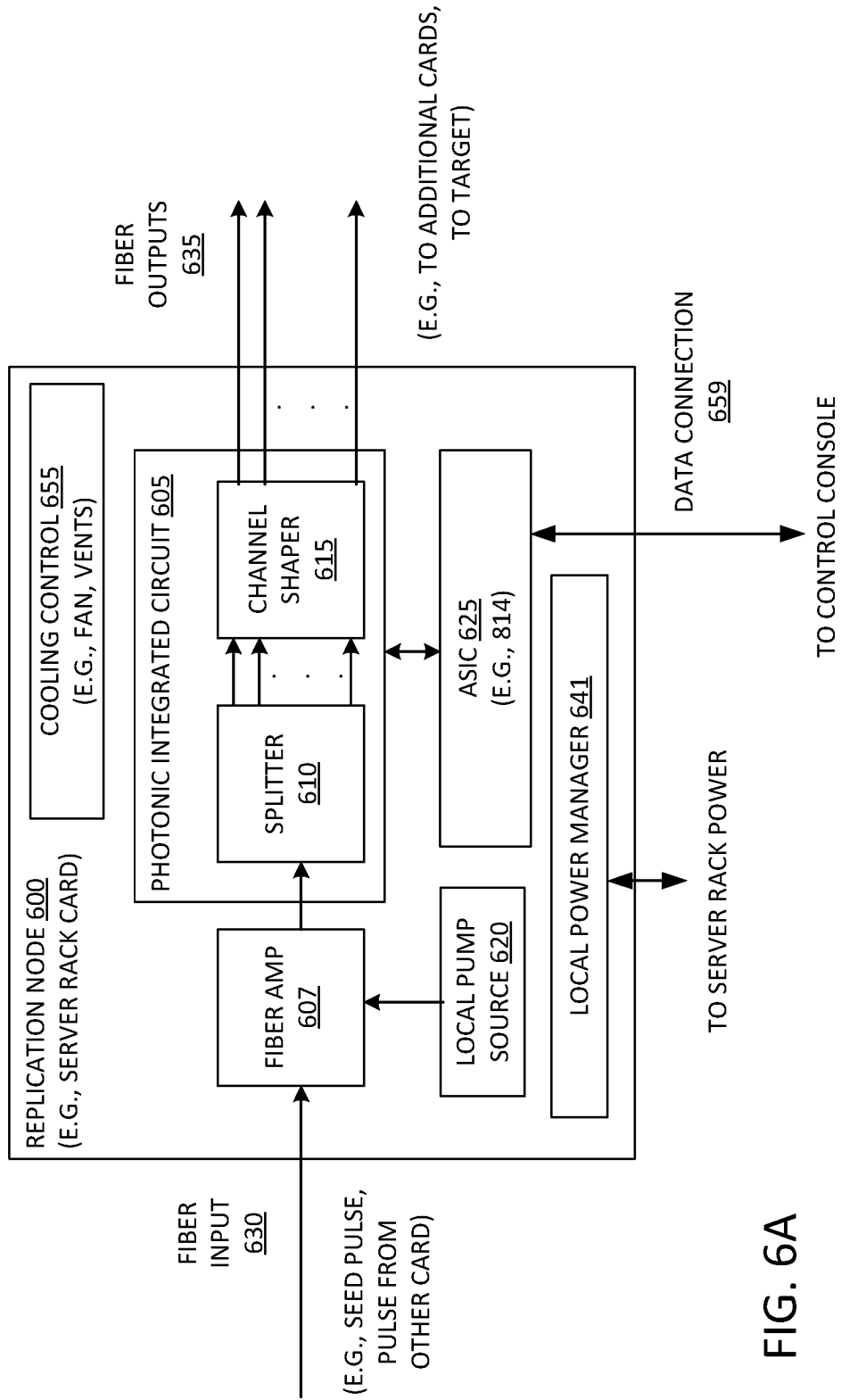
FIGS. 6A-6C show example replication nodes having photonic and electrical components, in accordance with some example embodiments.
Figure 6B:
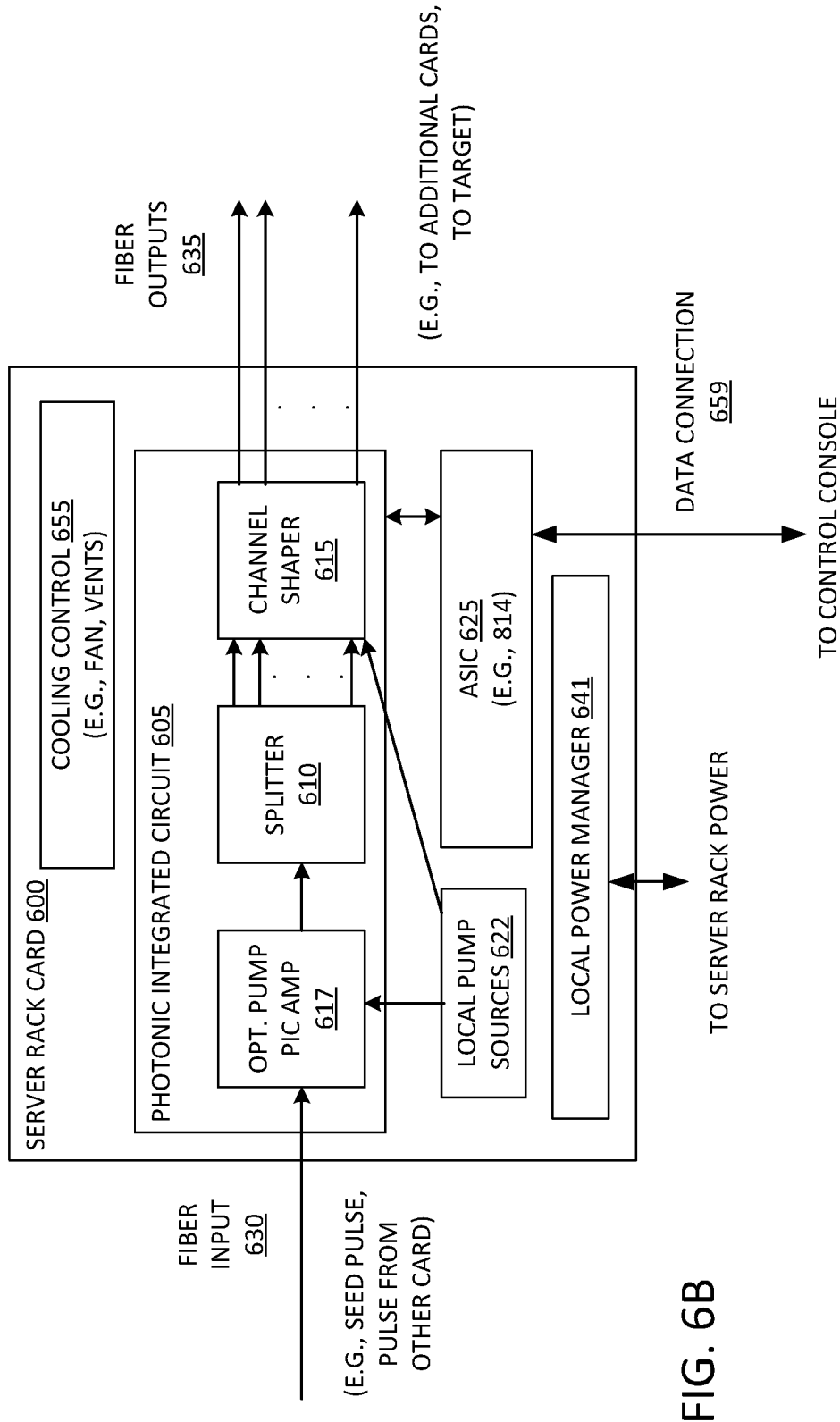
Figure 6C:
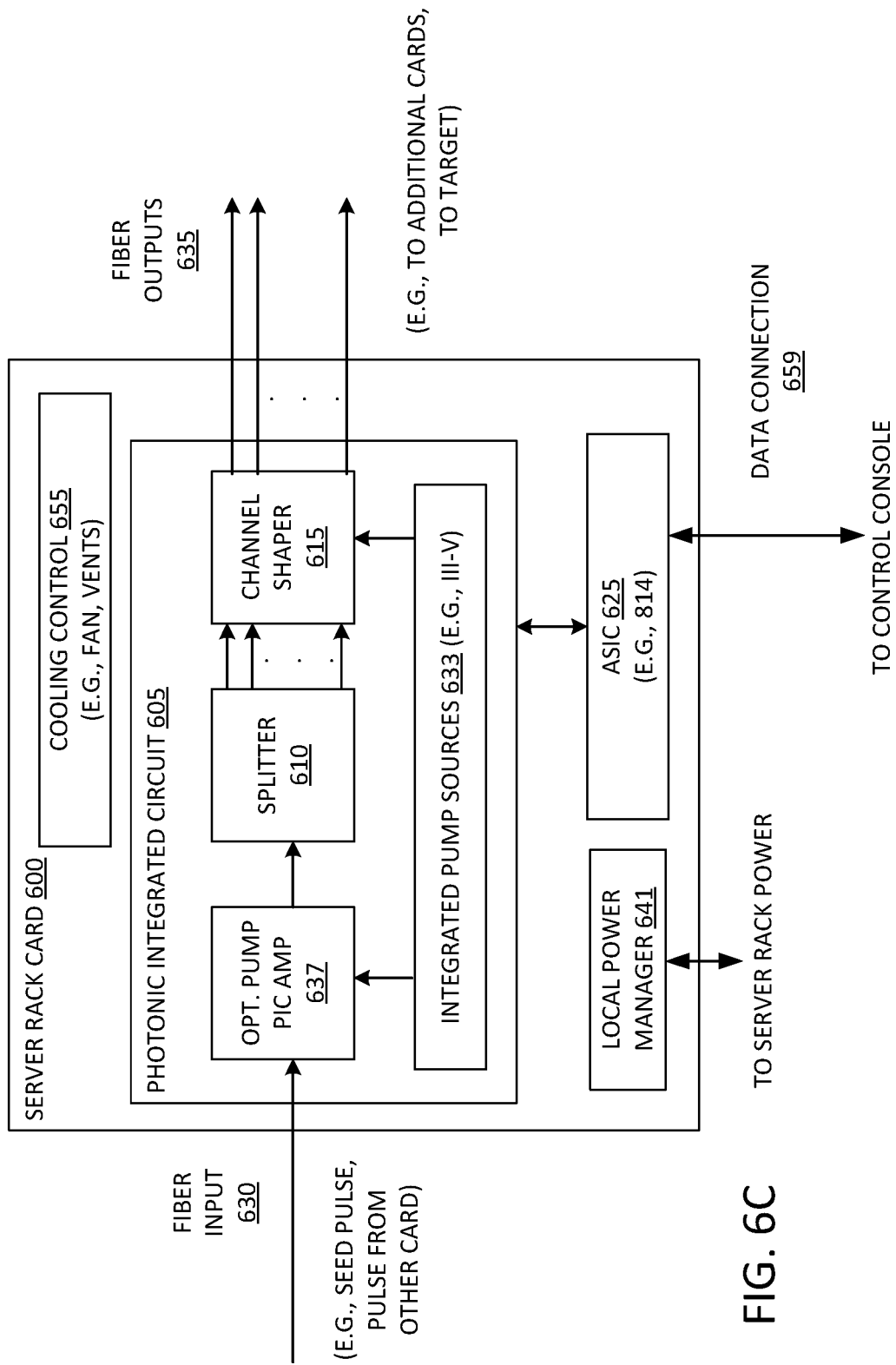

FIG. 6A shows an example replication node 600 that can be used as an amplifying splitter module in the cascaded amplifying splitter network, in accordance with some example embodiments. In the example of FIGS. 6A-6C, the replication node 600 is implemented as a plugin-able network card (e.g., server rack card) that can be inserted into a rack of a server tower, as discussed with reference to FIG. 7 below. In some example embodiments, the replication node 600 comprises one or more amplifying splitting components and optical tailoring components, which can be integrated on a single PIC or separated on different PICs or as discrete components.

In the example embodiment of FIG. 6A, the optical pulse is input into the replication node 600 via fiber input 630 and coupled to a fiber amp 607 (e.g., doped fiber laser, coil of doped fiber nearby card or mounted on the card) that is configured to receive optical pump power from a local pump source 620 (e.g., local pump laser module attached to the card) to optically amplify the pulse without adding noise. For example, the amplifier can be configured with a 16× gain, wherein an 8×-gain compensates for the 8-way power splitting of replication in the node, and a 2×-gain for noise/loss compensation per replication node.

In some example embodiments, the local pump source 620 can be implemented using different optical sources as a pump source, such as a diode laser operating at a absorption wavelength of a fiber dopant (e.g., 980 nanometer semiconductor laser diode), where the local pump source 620 may or may not be pulsed (e.g., 980 nanometer laser light in continuous non-pulsed form). Further, in some example embodiments, non-laser sources, such as LED generated light is implemented as pump source 620 (e.g., LED light filtered to a specific wavelength range and intensity.

A semiconductor optical amplifier (e.g., which performs optical amplification electrically using electro-optic effects) may not be used in some embodiments due SOAs causing noise and/or other nonlinear degradations which gets worse as more nodes are added (e.g., cascaded), and further, SOAs typically operate poorly at saturation and as such cannot remove noise by operation at saturation (e.g., an SOA may operate at saturation but then cause other unwanted nonlinear degradations to affect the pulse). In the example embodiments of FIGS. 6A-6C, the amplifiers of the replication nodes are optical amplifiers that are amplified optically (e.g., optical pumping using fiber amps, rare earth fiber amps, rare earth integrated amps, 1 meter coil of ytterbium fiber amplifier, 1 meter coil of erbium-doped fiber amplifier, and so on) whereby the optically amplified optical amplifier is operated at saturation to suppress noise in the node and across the cascade of nodes.

In the example embodiment of FIG. 6A, after optical amplification the amplified pulse is input into a splitter 610 on a photonic integrated circuit 605 (e.g., cascade of y-branches implemented integrated PIC waveguides, a splitting network of direct couplers, a splitting network of MMIs). The splitter 610 performs power splitting to create eight replicated pulses that are input into the channel shaper 615 (e.g., optical tailoring module 503, FIG. 5), which can perform further amplification, filtering, delaying, attenuation, and polarization adjustments, as discussed above with reference to FIG. 5. The replicated pulses are then output (e.g., via fiber outputs 635) to an output device. For example, the replicated pulses can be output via fiber outputs to additional cards (e.g., if replication card 600 of FIG. 6A is not the last replication node in a given channel or path) or to an optical target for processing (e.g., pulse target system 120); e.g., where the replication card 600 of FIG. 6A is the last replication node of a given channel.

As further illustrated in FIG. 6A, the replication node 600 may include one or more node control components such as local power manager 641 to provide power to the comments of the replication node 600 (e.g., electrical power to operate the local source 620, the ASIC 625, etc.), and cooling control devices 655 (e.g., fans, heatsinks, coolant circulation systems) to cool the physical components of the node as they operate to perform replication. Notably, the configuration of the replication node 600 in FIG. 6A to 6C can be configured with power and cooling requirements that readily can be integrated into existing data center rack technology. In the examples of FIG. 6A-6C, the replication node 600 is a rack card that draws 10 watts of power to operate, thereby enabling practical power and cooling management for scaling to add more channels to create more replicated optical pulses.

FIG. 6B and FIG. 6C show different configurations for the replication node 600, in accordance with some example embodiments. It is appreciated by one of ordinary skill in the art of modern photonics that one or more of the components of the replication node 600 can be integrated in the PIC or may be removed off the PIC (e.g., per a given design, cost, and performance considerations). In the example of FIGS. 6A and 6B, the optical pump amplifier 617 is integrated into the photonic integrated circuit and, optionally, into optional amplifiers in each channel of the channel shaper 615. In the example embodiment of FIG. 6C, the local optical source for the optically amplified optical amplifier is integrated in the photonic integrated circuit 605 as an integrated pump source 633 (e.g., III-V material fused to a portion of the PIC to enable electro-optical control of the active material in a III-V region) that uses electrical energy (e.g., 240 milliwatts) for optical pump power.

Figure 6D:
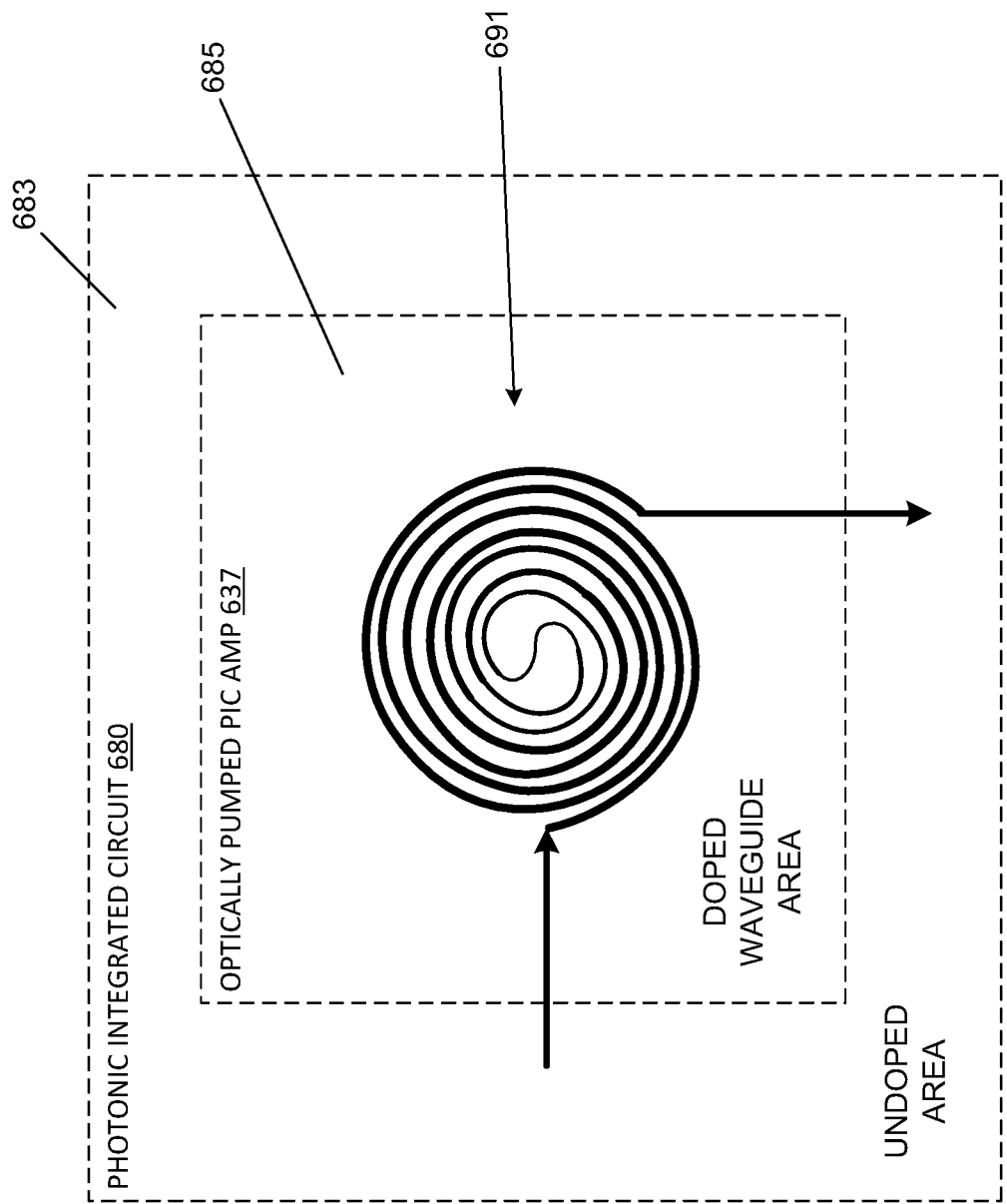
FIG. 6D shows an integrated optically pumped optical amplifier, in accordance with some example embodiments.

FIG. 6D shows an example configuration for the integrated optical amplifier 637 that is integrated in a photonic integrated circuit 683 (e.g., photonic integrated circuit 605), in accordance with some example embodiments. In place of a coil of fiber wire (e.g., fiber amp 607, FIG. 6A), the integrated amp 637 comprises a waveguide structure 691 that can be formed in the PIC layers. For example, in a Silicon (Si) based PIC, the structure 691 is formed from a Si-layer of the PIC. As an additional example, in a Silicon Nitride (SiN) based PIC, the structure 691 is formed from a SiN-layer of the PIC. In the example of FIG. 6D, the structure comprises one or more input waveguides that couple light (e.g., pulse light, pump source light) to a coil area (e.g., ½-meter coiled waveguide) to propagate and amplifier the light via doped elements, and the coil outputs to one or more output waveguides to other components of the photonic integrated circuit 608. Although only a single input and output arrow are shown in FIG. 6D for brevity, one of ordinary skill in the art appreciates that additional waveguides in and out of the spiral may be integrated in the amp (e.g., two inputs, one for the pulse the other for the source which are combined by an integrated optical coupler, and so on). In some example embodiments, to add optical pulse-robust amplification properties to the waveguide structure 691 a mask is fabricated such that rare earth doping material (e.g., erbium) can be applied via ion implantation to the photonic integrated circuit 680 such that the doping only occurs in the doped waveguide area (e.g., an area comprising the waveguide structure 691) while leaving the rest of the PIC 680 undoped.

Figure 7:
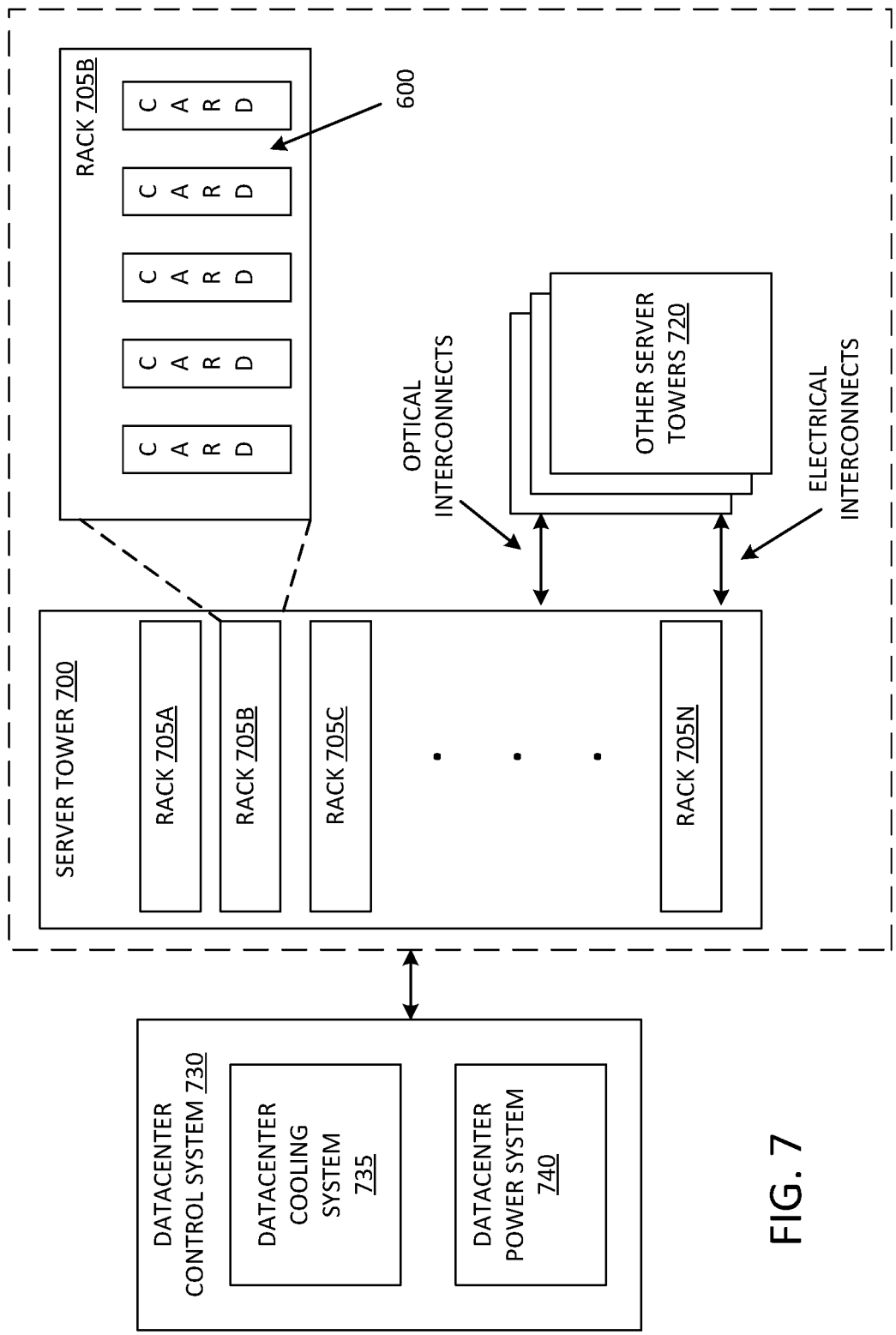
FIG. 7 shows a data center configuration for the cascaded optical pump splitter system, in accordance with some example embodiments.

FIG. 7 shows an example data center configuration for the cascaded optical pump splitter system 100, in accordance with some example embodiments. As discussed above, the cascaded replication system components may encompass a large number of nodes that can require a significant amount of resources (e.g., power, material, cooling) as the system is cascaded at each level to increase the quantity of replicated output pulses. In some example embodiments, as discussed above, the replication nodes are integrated as network cards that draw an amount of power that is congruent with a given server rack card power budget (e.g., 10 watts). Further, the cooling of a given node can be managed by local card cooling or tower cooling that is available via data center or server center infrastructures. In the example embodiment of FIG. 7, a server tower 700 comprises a plurality of server racks, into which a plurality of cards can be inserted, where one or more replication nodes can be integrated on a given card. As an example, rack 705B comprise a plurality of cards including a card corresponding to replication node 600 discussed above. In some example embodiments, each card has its own optical pump source for local optical amplification as discussed above. In some example embodiments, one or more components used by the cards is moved to a specific rack or out of the rack to satisfy power or heating constraints. For example, in some example embodiments, each replication node is card that does not have local pump (e.g., local pump source 620, 622), and instead a pump source is provisioned for the entire tower 700. That is, as an example, the all of the nodes in a given rack can receive optical pump power from an optical pump that is mounted on the outside of the tower (e.g., for power and cooling reasons) and the pump light is fed to the plurality of amplifiers via fibers; thereby decreasing the power consumption of the cards and additionally potentially removing a source of extraneous heat, in accordance with some example embodiments.

In some example embodiments, the replication nodes are distributed across other towers, such as server server towers 720 that each have a plurality of nodes (e.g., cards), where the server towers are interconnected via electrical interconnects (e.g., ethernet, electrical control interfaces, ribbon cable, and so on) and optical interconnects (e.g., fibers). Further, the collection of the server tower 700 and other server towers is managed by a data center control system 730 which can control the cooling for the towers via the data center cooling system (e.g., data center air conditioning, or other cooling methods implemented for servers) and power for the cascaded optical pump splitter system 100 is provided and managed by the data center power system 740 (e.g., 100 watts per tower, or approximately 2.6 megawatts for the the cascaded optical pump splitter system 100 having 262,144 replicated optical pulses on separate channels).

Figure 8:
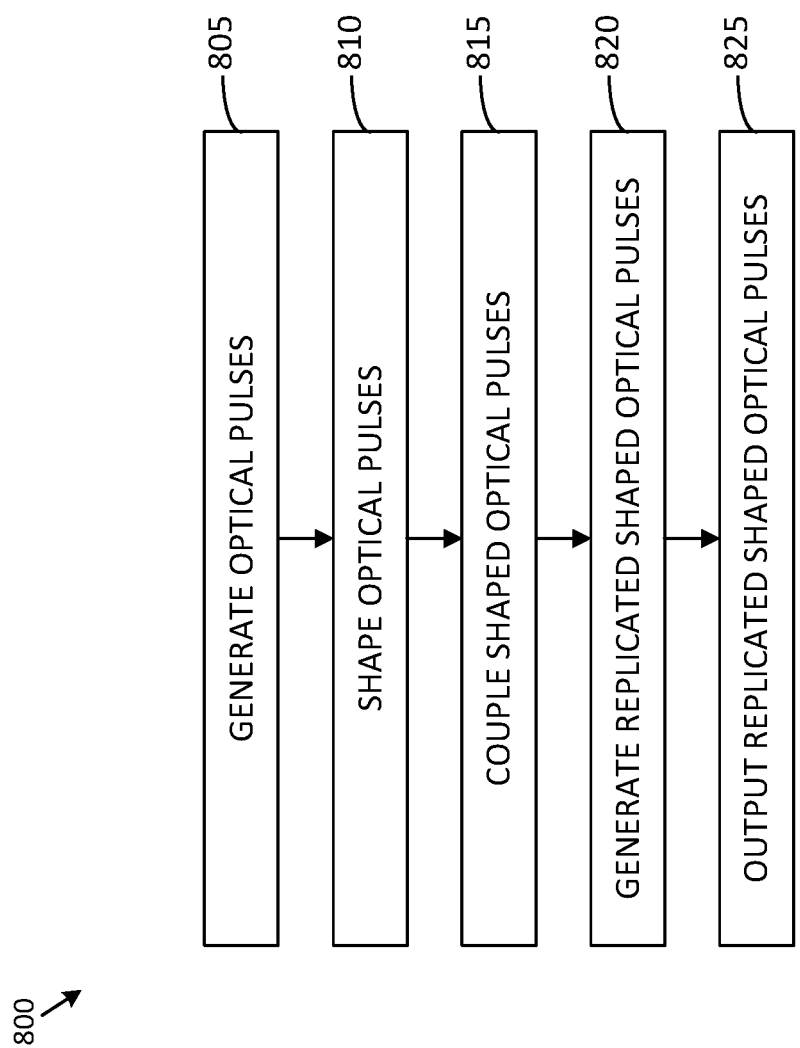
FIG. 8 shows a flow diagram when example method for implementing the the cascaded optical pump splitter system, in accordance with some example embodiments.

FIG. 8 shows a flow diagram when example method 800 for implementing the the cascaded optical pump splitter system 100, in accordance with some example embodiments. At operation 805, the cascaded optical pump splitter system 100 generates optical pulses. For example, at operation 805, the seed laser 250 generates a plurality of optical pulses. At operation 810, the cascaded optical pump splitter system 100 shapes the optical pulses. For example, at operation 810, each of the optical pulses generated by the seed laser 250 are shaped by the pulse shaper 255 to form shaped optical pulses. In some example embodiments, the shaped optical pulses are generated according to calibration settings set from calibration process (e.g., to adjust pulse shaping based on final outputs of the system to the pulse target system 120), as discussed in further detail below with reference to FIG. 9.

At operation 815, the cascaded optical pump splitter system 100 and couples the optically shaped pulses to a replicate or system. For example, at operation 815, the shaped optical pulses are coupled via a fiber (e.g., polarization maintaining fiber, single motor fiber) to an input port of a first cascade replication node (e.g., replication node 600, a server rack card). In some example embodiments, the coupled-to first node is a first replication node in a cascaded amplifying splitter system (e.g., cascaded amplifying splitter network 110).

At operation 820, the cascaded optical pump splitter system 100 generates replicated shaped optical pulses. For example, the shaped optical pulse is first replicated by a first node at a first level to generate eight replicated pulses, and each replicated output is further replicated by an additional note that generates eight replicated pulses, and further replication is implemented in further levels with further nodes, as discussed above. Some example embodiments, at each level of replication, an input optical pulse can be amplified, split, and each split pulse can be further adjusted on separate channels (e.g., via delay line to adjust for temperature drifts, filtering to filter out unwanted wavelengths and thereby reshape the pulse, attenuate a given channel using a variable optical attenuator, and adjust polarization of the channel).

At operation 825, the cascaded optical pump splitter system 100 outputs the replicated shaped optical pulses. For example, the cascaded optical pump splitter system 100 comprises direct fiber connections to couple each pulse to a given target system (e.g., FIG. 1A). In some example embodiments, each of pulses is coupled into an optical switch network for routing to different target systems (e.g., FIG. 1B). For example, one or more subsets of the replicated pulses can be routed to a switch network to a target processing node (e.g., HSPS PIC) that is nearest to the physical hardware (e.g., physical cards) that generated the subset of pulses. Further examples of target systems are discussed below with reference to FIGS. 11 to 15.

Figure 9A:
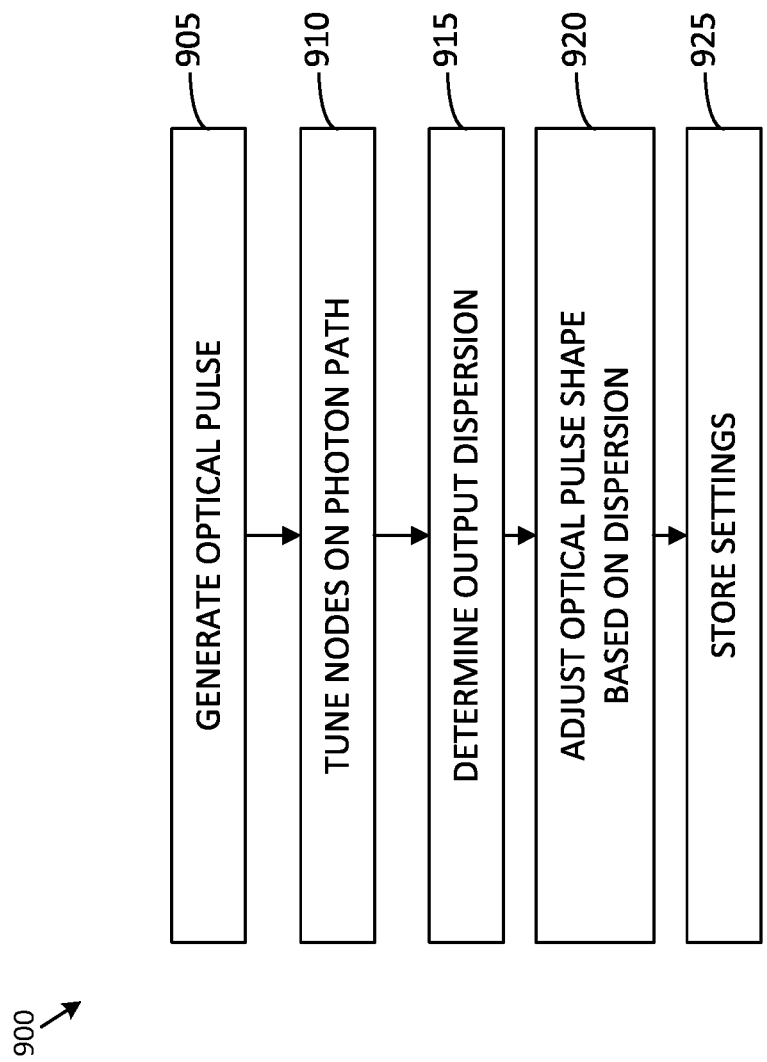
FIG. 9A shows a flow diagram of an example method for configuration of the cascaded optical pump splitter system, in accordance with some example embodiments.

FIG. 9A shows a flow diagram of an example method 900 for configuration of the cascaded optical pump splitter system 100, in accordance with some example embodiments. At operation 905, the cascaded optical pump splitter system 100 generates an optical pulse. The optical pulse may be a specifically tuned or otherwise configured preferred optical pulse that is determined to function well in target system. For example, with reference to FIG. 11, the optical pulse may have a center wavelength, shape, and power that functions well in a given HSPS (e.g., input of the preferred optical pulse of the desired parameters is tested and shown to increase probabilistic generation of photon pairs). As an additional example with reference to FIG. 13 that depicts a network clock example embodiment, the parameter of the preferred optical pulse may be a different wavelength at a higher power or intensity to ensure the replicated pulses can propagate to geographically separated nodes of the system 1400.

At operation 910, the cascaded optical pump splitter system 100 is tuned by tuning the nodes on the photon paths. For example, a given path (e.g., channel, photon world-line) through the cascaded switches is first determined and each node that replicates the pulse along the path is tuned (e.g., VOA is tuned for given channels loss, delay is tuned to account for variations in fiber connections along the path, polarization compensation at each node, etc.). In some example embodiments each of the paths are channels are tuned by tuning each replicated note along the respective channels to ensure the replicated optical pulses are output in a same way (e.g., simultaneously, in the same time bin).

Figure 11:
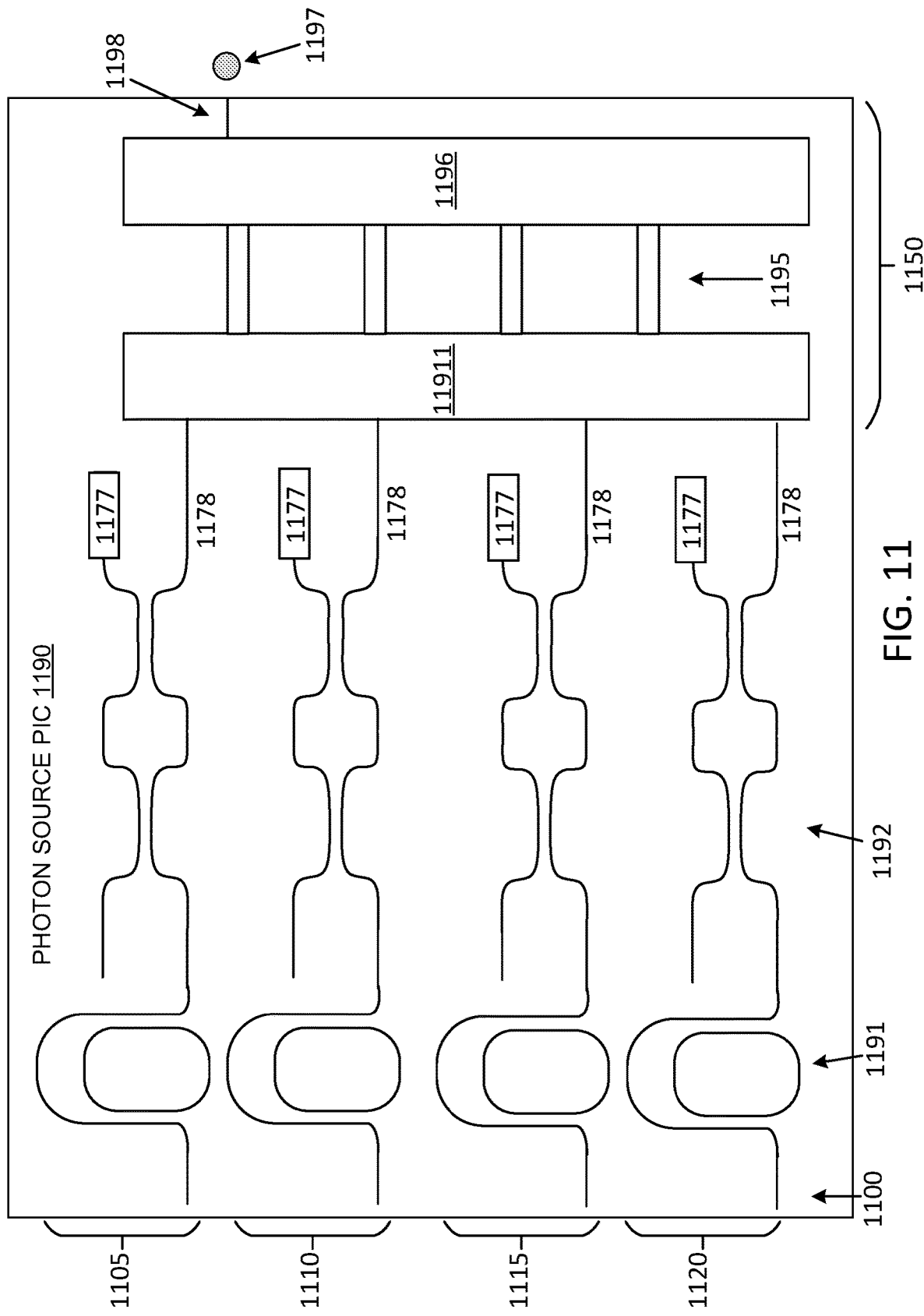
FIG. 11 shows an example of a single photon source photonic integrated circuit (PIC), in accordance with some example embodiments.

At operation 915, the output dispersion of the replicated optical pulses is determined, and at operation 920 the cascaded optical pump splitter system 100 is turned to pre-compensate for the dispersion by changing the seed pulse's shape (e.g., the optical pulses generated from the pulse shaper 255 and input into the cascaded amplifying splitter network 260 to a first amplifying splitter node). In this way, by implementing dispersion compensation at the seed level for a plurality of tuned amplifying splitters, the output pulses can be replicated to a high order of channels (e.g., 200,000 replicated pulses) that perform well in a given target system. For example, with reference to FIG. 11, by pre-compensating at the seed pulse level and replicating through the tuned replicates, the output replicated pulses are configured to function well in-concert across all nodes of a given target system. In the context of FIG. 11, performing well in-concert across all nodes corresponds to each replicated pulse operating in a similar manner in a respective HSPS to generate photon pairs that are highly indistinguishable (e.g., as evidenced in a given HOM test), thereby allowing a great number of single entangle-able single photons to be generated which can be entangled for quantum information processing.

Figure 9B:
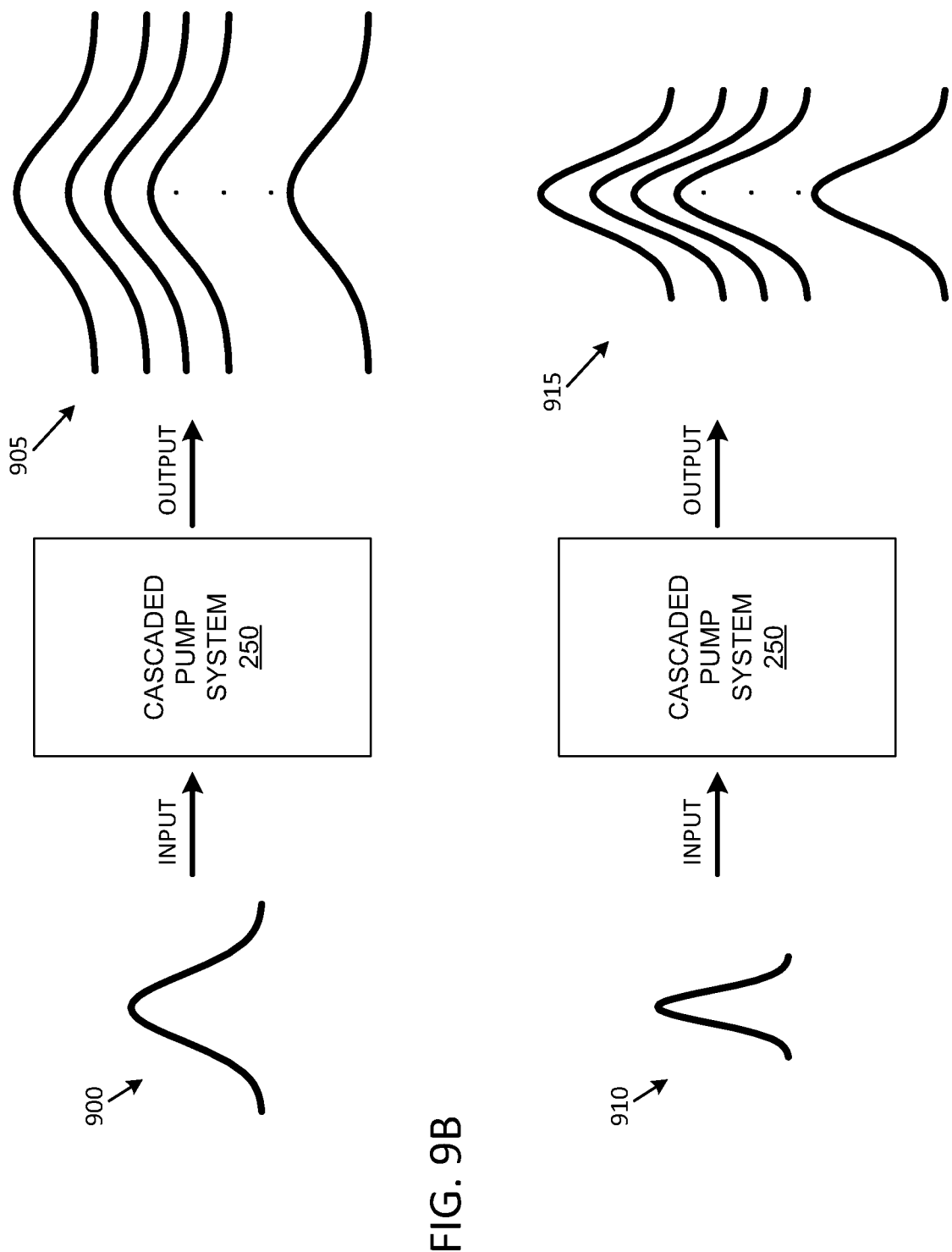
FIG. 9B shows example dispersion compensation, in accordance with some example embodiments.

In some example embodiments, groups of nodes are tuned collectively with the same parameters based on the groups of nodes having a similar tuning issue (e.g., increased temperature affecting each card or node). In some example embodiments, group tuning is further adjusted dynamically during runtime, as further discussed with reference to FIG. 9C. In some example embodiments, tuning is performed in conjunction with comparing replicated pulses from different channels. For example, the replicated photon can be interfered with the replicated pulse of another channel (e.g., in an interferometer, multi-mode interferometer on a PIC, phase shifted in an MZI and interfered in a MMI or direct coupler) to determine how identical the replicated photons of the different channel are. In some example embodiments, after interference testing FIG. 9B shows an example diagram of the processes of operations 915 and 920, in accordance with some example embodiments. In FIG. 9B, the desired optical pulse 900 (e.g., preconfigured to perform well and produce a desired result in the target system) is illustrated as having a preferred or preconfigured pulse shape. When replicated by the cascaded amplifying splitter network 260, optical dispersion is imparted on the replicated pulses from the components of the cascaded amplifying splitter network 260 (e.g., dispersion from fiber node interconnects, amp-based dispersion, and so on). As illustrated in FIG. 9B, the resulting replicated optical pulses have a dispersion (e.g., chirp) that is different from the desired shape to be replicated (the shape of pulse 900). In some example embodiments, the system 900 is tuned to pre-compensate for the dispersion of the cascaded amplifying splitter network 260. For example, with reference to the lower half of FIG. 9B, different parameters of the input pulse are modified (e.g., intensity, wavelength, bandwidth) such that a compensated pulse 910 is identified (e.g., via testing, or look-up table having empirically determined values), and then input into the cascaded amplifying splitter network 260 to generate a high order of replicated pulses 915 which have the original characteristics (e.g., shape, chirp) of the pulse 900.

With reference to FIG. 9A, at operation 925, the system stores the determined settings of method 900 in memory in the cascaded optical pump splitter system 100. For example, each node 600 can store calibration settings for each of its components that are determined from operation 910. As an additional example, at operation 925, the control module that is controlling the source (e.g., control console 105) stores the configured new pulse shape settings to generate replicated pulses that are compensated for the dispersion along the photons' respective paths in the cascaded system 260.

Figure 10:
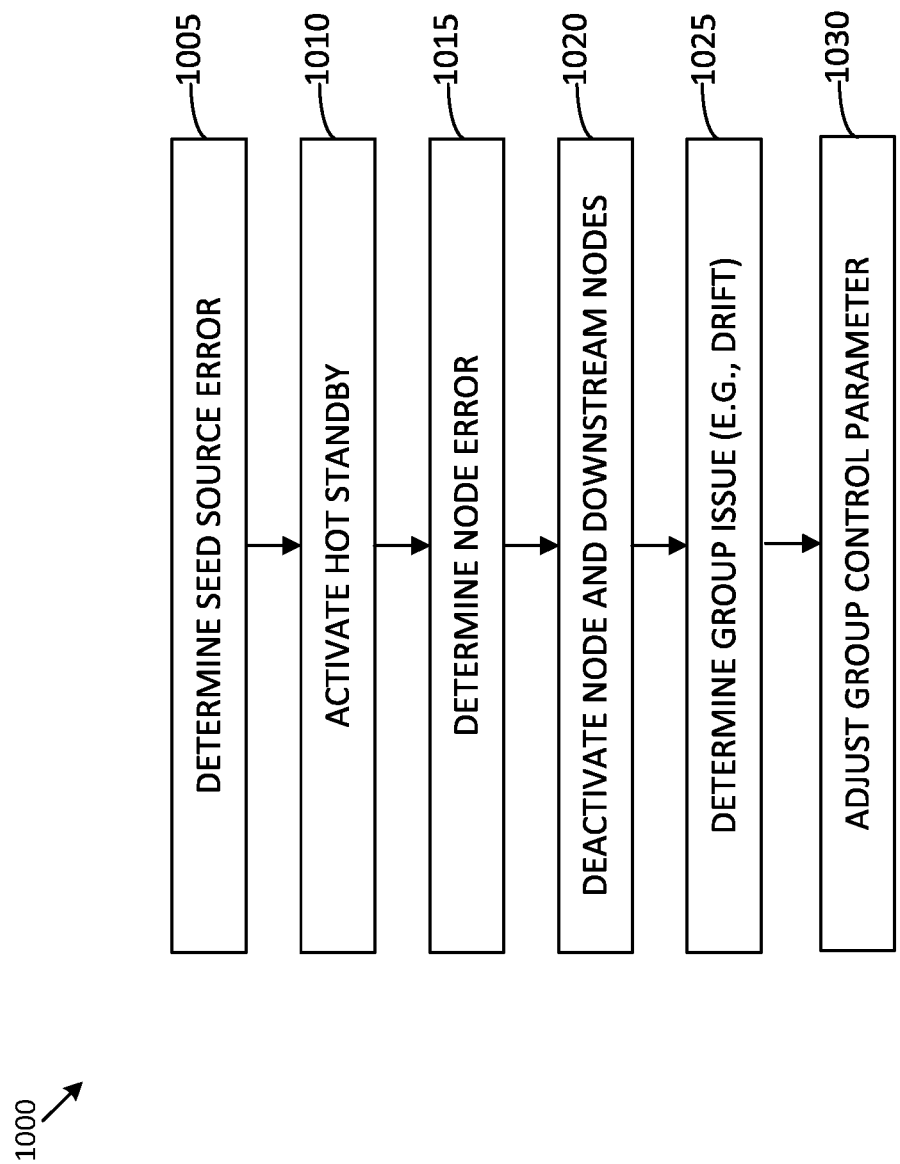
FIG. 10 shows an example flow diagram of a method for managing the cascaded splitter network during operation, in accordance with some example embodiments.

FIG. 10 shows an example flow diagram of a method 1000 for dynamic (e.g., run time) control of the cascaded optical pump splitter system 100 for correction of issues or errors, in accordance with some example embodiments. At operation 1005, the cascaded optical pump splitter system 100 determines the seed source error. For example, the seed laser 250 can generate a plurality of optical pulses which are replicated to form shaped optical pulses which can be used in quantum information processing. In those example embodiments, missing pulses can drastically affect whether the quantum information processing test or complete or fail (e.g., for lack of information that would otherwise be in entangled photons). In some example embodiments, the seed laser 250 malfunctions and at operation 1010, the cascaded optical pump splitter system 100 switches the input to the pulse shaper 255 to a "hot standby" laser system. In some example embodiments, the hot standby laser system is identical laser system to the malfunctioning laser system that is kept is ready-mode such that it can rapidly be switched to minimize missing pulses (e.g., layers of missing pulses from one or more entire arms not replicating the seed pulse). At operation 1015, the cascaded optical pump splitter system 100 determines that one or more of the nodes (e.g., node 600) has malfunction or is not working (e.g., not output photons). In some example embodiments, in response to determining that one or more of the nodes is malfunctioning, the cascaded optical pump splitter system 100 deactivates the malfunctioning nodes and deactivates all downstream notes that are downstream from the malfunctioning nodes to avoid propagation of errors from the malfunctioning nodes. In some example embodiments, the number of channels implemented by the cascaded amplifying splitter network 260 is greater than the number of channels used by the target system, such that if one or more set of nodes has to be deactivated (e.g., due to malfunction or errors), one or more of the non-used replication nodes can be activated. In some example embodiments, the standby nodes are in a standby channel such that all nodes are activated at once to activate the entire channel to replace a malfunctioning channel and maintain the original number of replicated photon channels.

In some example embodiments, the cascaded optical pump splitter system 100 determines a group issue of a group of nodes. For example, a set of nodes (e.g., node 600) may be affected by a global factor that affects the entire group in a similar manner. For example, a set of server rack cards (nodes) in a given set of server towers may heat up in one side of a data center than the other towers, where the heating can affect the replication characteristics of channels of the affected nodes in the group.

At operation 1030, the cascaded optical pump splitter system 100 adjusts a group node control parameter to correct the identified issue of operation 1025. For example, to correct for local temperature changes of groups of nodes, the control console 105 can transmit instructions to nodes to increase amplification for those nodes (e.g., to compensate for temperature), adjust the polarization setting, adjust the delays, to correct the group of nodes to ensure they output replicated pulses that are identical to the other replicated pulses.

FIG. 11 shows an example of a single photon source photonic integrated circuit 1190, in accordance with some example embodiments. In the example of FIG. 11, the single photon source photonic integrated circuit 1190 comprises four heralded single photon sources 1105-1120 that are configured to probabilistically generate photon pairs (e.g., an idler and signal photon), however one of ordinary skill in the art appreciates that in some embodiments the number of sources included on a given source PIC can be increased (e.g., HSPS chip with 128 HSPS sources). As illustrated in FIG. 11, the photonic integrated circuit 1190 comprises a photon source array that generates photons non-deterministically using each of the heralded photon sources, comprising a first heralded single photon source 1105, a second heralded single photon source 1110, a third heralded single photon source 1115, and a fourth heralded single photon source 1120.

In some example embodiments, each source in the array comprises a waveguide ring resonator 1191. In some example embodiments, each source in the array receives an optical pulse (e.g., one of the replicated pulses from the cascade system 100) and propagates the optical pulse through the waveguide ring resonator 1191 to undergo non-linear interactions with the medium of the PIC (e.g., silicon) to generate non-deterministically photon pairs comprising a idler photon and signal photon. In each of the sources, the output from the ring 1191 may undergo further filtering and routing (e.g., via wavelength division multiplexing) such that the each of the signal photons are directed to detectors 1177 and each of the idler photons are directed to output paths 1178.

In some example embodiments, the output paths 1178 are coupled to a switch 1150. In some example embodiments, the switch 1150 is configured as a generalized MZI (abbreviated GMZI, e.g., an MZI having four or more input waveguides) and can include a first quantum optical coupler network 11911 (e.g., Hadamard network, a hierarchy or tree of directional couplers) that distributes the quantum light onto a plurality of waveguide arms 1195 and a second quantum optical coupler network 1196 to further distribute th quantum light to one or more outputs. In some example embodiments, a Mach Zehnder interferometer comprises a being splitter that divides an input light into two equal parts which travel on different paths and then combined back together again on a second beam splitter. The path length can be adjusted between the two arms can be adjusted such that the phase difference of classical light input into the Mach Zehnder interferometer can cause all of the light to be output from a single output port. In some example embodiments, the path links of the different arms are not adjusted but rather physical characteristics of one or more of the arms are modified to implement phase shifts of light traversing the given arm, thereby enabling the direction of the input light to a single output port were both output ports. When classical or "bright light" is input into a given Mach-Zehnder interferometer the device can function as a splitter or guide that guides the classical light towards one or more of the output ports. Interestingly, when non-classical light (e.g., single photons, quantum light) is input into an MZI, the photon is split and propagates as a super position of being in each arm at the same time as a propagates through the device. As an example, if the MZI is in a 50/50 splitter configuration (e.g., via path length or active phase adjustments), the super position of the single photon of quantum light is recombined at the second splitter and there is a 50/50 chance of emerging from either output port. Thus, the MZI can function as a classical and non-classical (e.g., quantum) photonic device.

In some example embodiments, the switch 1150 comprises phase shifters on the arms to modify a distribution of the quantum light in the switch 1150. For example, in a N-to-1 mux configuration, the PIC 1190 can operate as a deterministic source of single photons that directs any idler photon 1197 received (e.g., at different times to the probabilistic nature of the photon pair production) to the same output 1198.

In some example embodiments, the idler photons generated from the PIC 1190 are highly identical and entangleable with one another. In some example embodiments, the idler photons are highly identical based on the performance of the photon source PIC 1190 and further based on the quality of the received optical pulse (e.g., a replicated pulse) that is used to generate a given probabilistic pair of photons. As such, in some example embodiments, due to the quality of the replicated pulses (e.g., that they are greatly similar or identical to the seed pulse) and large scalability of the pulse system, a large number of PIC sources can be implemented to generate idler photons in a more controlled manner (e.g., deterministic) where the photons are highly identical and can entangle with one another (e.g., in another GMZI, not depicted in FIG. 11) to perform entanglement based quantum information processing tasks.

Figure 12:
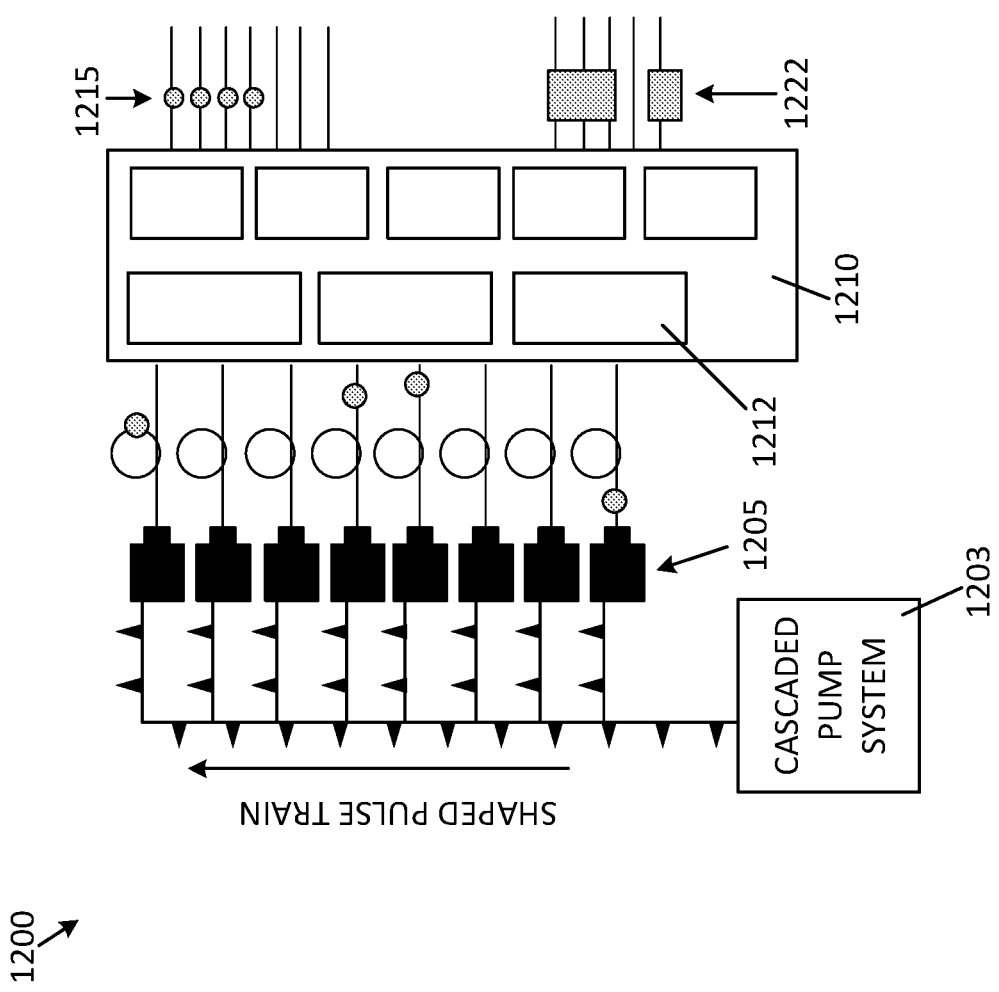
FIG. 12 illustrates a cascaded pump system integrated in a photonic quantum information processing system, in accordance with some example embodiments.

FIG. 12 illustrates the system 100 integrated in a photonic quantum information processing system, in accordance with some example embodiments. As discussed above, the system 1203 is configured to generate an optical pulse with a lower power pumped laser, and then shape the optical pulse to form a shaped optical pulse that is configured to increase a likelihood of photon pair generation by scaling probabilistically. For example, the seed pulse can be shaped to modify a center wavelength of the optical pulse, and control a spectral phase (e.g., chirp) of the optical pulse to form a shaped optical pulse. The shaped optical pulse can then be replicated by a cascaded set of amplifying splitters that can receive the shaped optical pulse and create replicas of the pulse. In some example embodiments, each of the amplifying splitter module actively monitors the received pulse to determine whether any of the set parameters (e.g., as set in the shaped pulse, such as power, spectrum, chirp) have changed (e.g., due to dispersion, noise, loss), and if so then modify the received optical pulse so that it is again identical to the original shaped pulse. The cascade network of amplifying splitters can cascade many times to generate a large amount of replicated shaped optical pulses (e.g., 200,000 to 1 million replicated pulses). In this way, a great number of probabilistic photon sources, each of which only generates signal photons with a low likelihood (e.g., 1%) can receive many shaped pumped pulses in an efficient manner using a single low-power pumped laser source. Further, due to the careful shaping, monitoring, and reshaping of the optical pulses as they are replicated to drive the sources, the generated photons from the sources 1205 are generated from optical pump inputs and thereby generate highly indistinguishable signal photons that are entangle-able with each other with high-likelihood (e.g., high Hong-Ou-Mandel (HOM) test values of indistinguishability).

Continuing, the deterministic single photons generated by the sources 1205 (photonic integrated circuit 1190, FIG. 11) are then coupled to a plurality of photon entanglement circuits 1210. Each of the entanglement circuits may receive one or more of the idler photons and entangle the photons using a switch, such as switch 1212 (e.g., GMZI). For example, due to the heralded idler photons being highly identical (e.g., as generated by the PIC 1190 and the replicated pulses), the heralded idler photons can be input simultaneously into different inputs of the switch 1212 to probabilistically generate entangled state outputs. For example, as shown in FIG. 12, a first set of photons that are output by the entanglement circuits may fail and output individual photons 1215 on different waveguides; whereas other sets of photons probabilistically succeed and undergo entanglement, leading to output of the entangled photonic state 1222 across a plurality of output waveguides.

Figure 13:
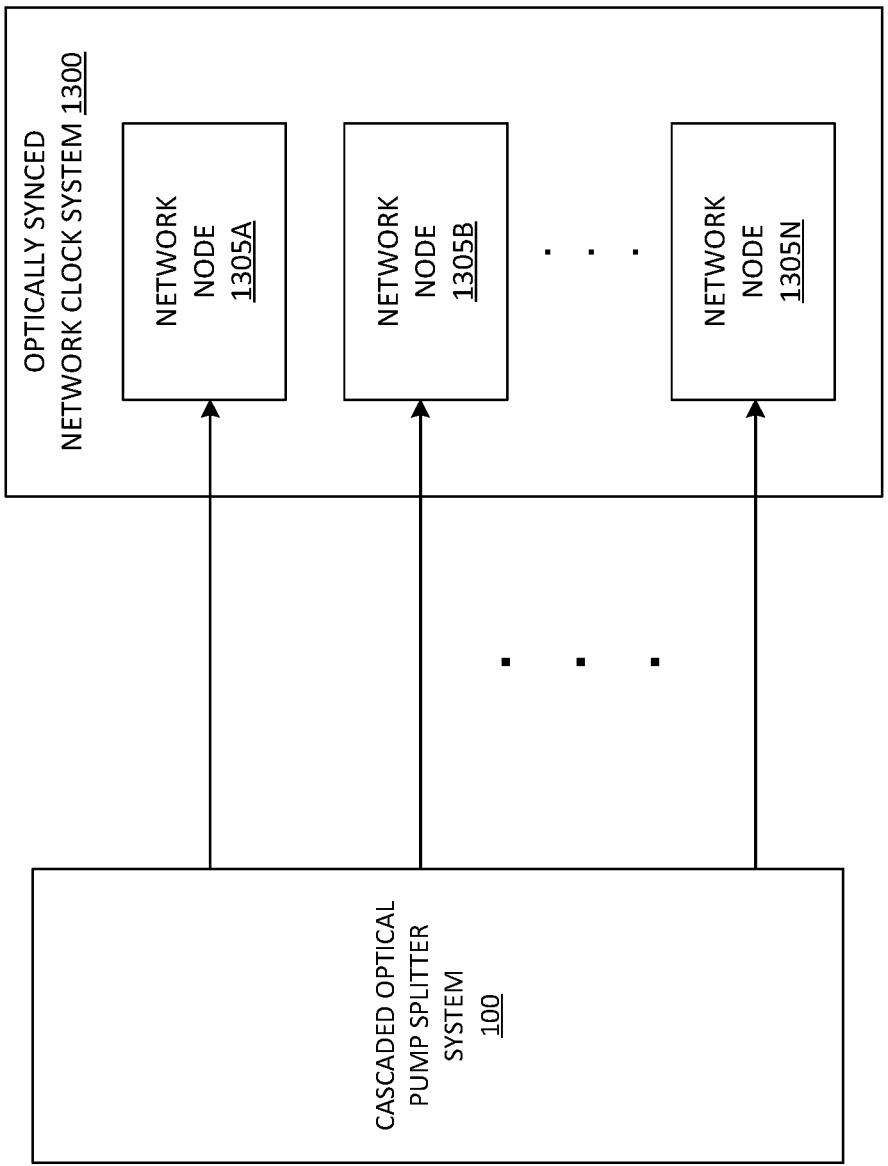
FIG. 13 shows an optically synced network clock system to process the replicated optical pulses, in accordance with some example embodiments.

FIG. 13 shows an optically synced network clock system 1300 to process the replicated optical pulses. In the example embodiment of FIG. 13, the optically synced network clock system 1300 comprises a plurality of network nodes 1305A-1305N, such as different computers or databases that may be spread out geographically. In some example embodiments to ensure high precision timing the replicated pulses are transmitted from the cascaded optical pump splitter system 100 to the optically synced network clock system 1300 for network time syncing purposes. For example, each node of the optically synced network clock system 1300 may sync an internal oscillator (e.g., quartz oscillator) to the received replicated pulse which are received at the same time based on adjustments of fibers and coupling devices between the cascaded optical pump splitter system 100 and the optically synced network clock system 1300.

Figure 14:
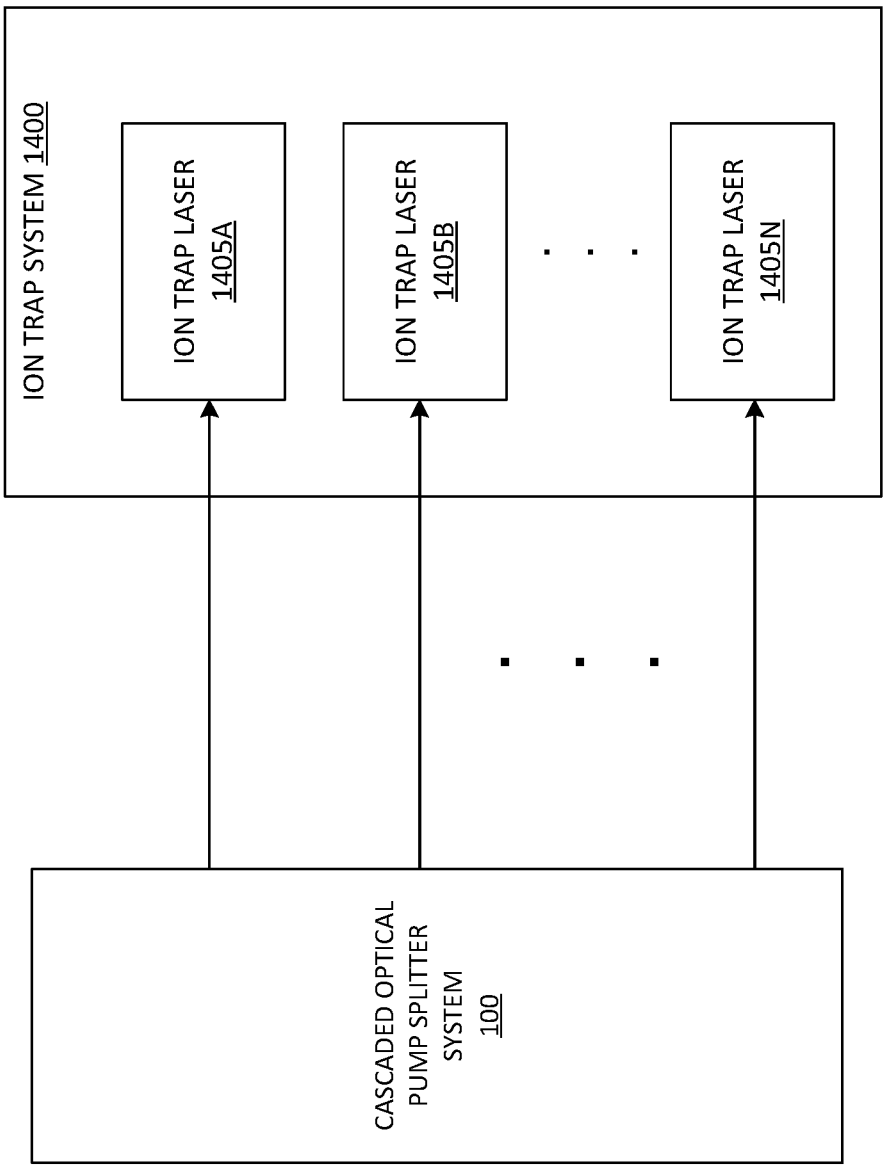
FIG. 14 shows an ion trap system implemented to process replicated pulses from the cascaded amplifying splitter system, in accordance with some example embodiments.

FIG. 14 shows an ion trap system 1400 implemented to process replicated pulses from the cascaded amplifying splitter system 100, in accordance with some example embodiments. In the example of FIG. 14, the ion trap system 1400 comprises a large quantity of high precision ion trap lasers 1405A to 1405N that control ions (e.g., for ion trap based information processing, quantum computing). In some example embodiments, each of the ion traps is seeded with an identical replicated pulse from the cascaded amplifying splitter system 100 to generate precise outputs from the ion trap lasers 1405A to 1405N.

Figure 15:
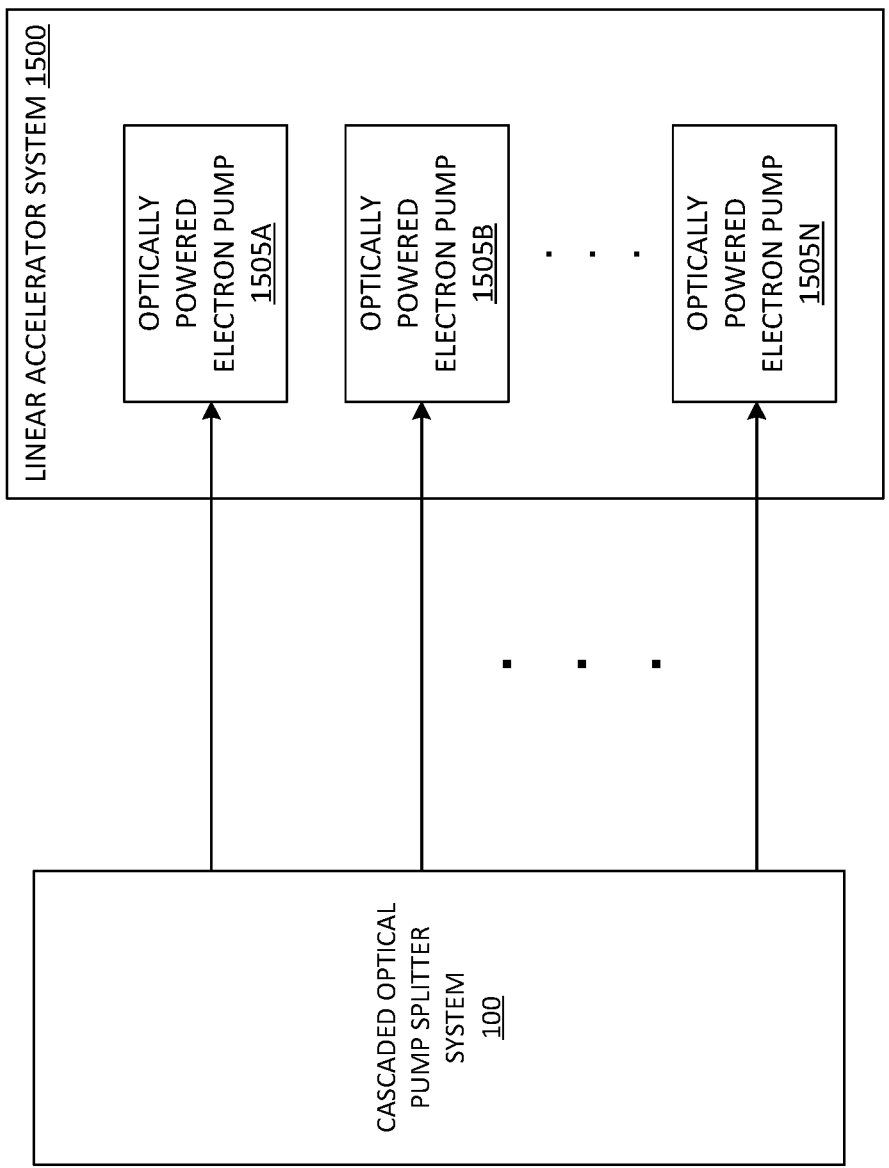
FIG. 15 shows a linear accelerator system implemented to process replicated pulses from the cascaded amplifying splitter system, in accordance with some example embodiments.

FIG. 15 shows a linear accelerator system 1500 implemented to process replicated pulses from the cascaded amplifying splitter system 100, in accordance with some example embodiments. In the example of FIG. 15, the linear accelerator system 1500 is a free electron laser that generates strong pulses of radiation via generation of relativistic electrons. In some example embodiments, the linear accelerator system comprises a large quantity of optically powered electron pumps 1505A to 1505N to generate a laser-like short pulse of radiation.

Figure 16A:
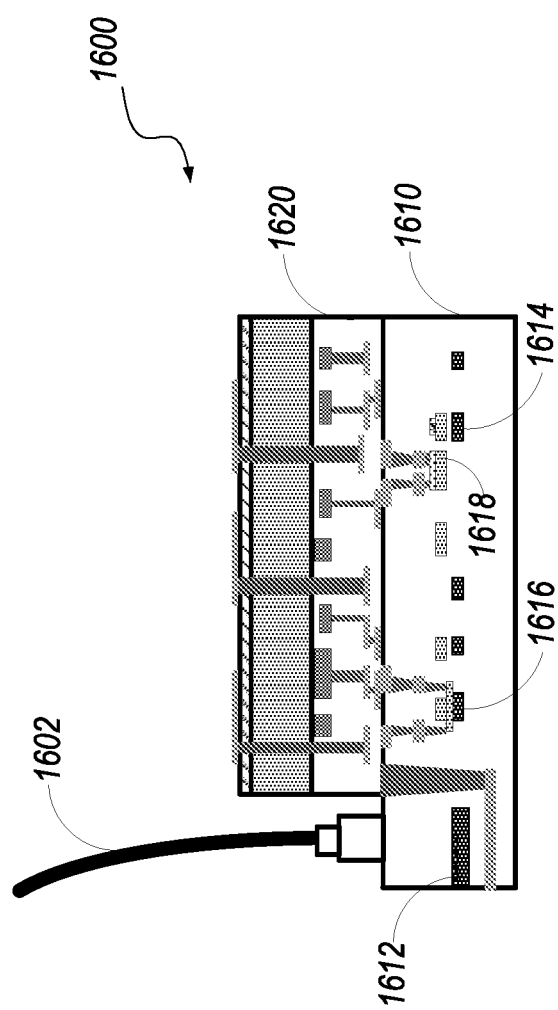
FIGS. 16A-16B show example fabrication stacks, in accordance with some example embodiments.

FIG. 16A illustrates an example of a structure 1600 including an optical fiber 1602 coupled to an EPIC die stack via a grating coupler 1612 according to certain embodiments. The EPIC die stack may be an example of an EPIC die stack. As described above, the EPIC die stack may include a PIC die 1610 and an EIC die 1620. PIC die 1610 may include various passive and active photonic components, such as grating couplers 1612, waveguides 1614, delay lines, switches 1616, filters, photodetectors (e.g., Ge photodiode-based photodetectors), single photon generation circuits, single photon detectors 1618, resource state generation circuits, logical qubit detection circuits, and the like, as described above and below. In some embodiments, PIC die 1610 may also include other structures, such as heating or cooling structures, temperature sensors, and thermal and/or optical isolation structures, for controlling and/or improving the performance of certain photonic components. EIC die 1620 may include logic and/or control circuits that may be used to, for example, control and/or improve the performance of the photonic integrated circuits, provide inputs to the photonic integrated circuits, and readout outputs from the photonic integrated circuits (e.g., the photodetectors and single photon detectors).

FIG. 16A shows that optical fiber 1602 may be used to send light (e.g., pump laser pulses for single photon generation or optical data communication signals) into PIC die 1610 of the EPIC die stack through grating coupler 1612.

Grating coupler 1612 may include, for example, a straight or slanted grating that can couple light from optical fiber 1602 into waveguide 1614 in PIC die 1610. Light coupled into PIC die 1610 by grating coupler 1612 may be delivered to other photonic integrated circuits in PIC die 1610. The light coupled into PIC die 1610 may be used, for example, to provide data communication or to pump a single photon generator. In some embodiments, optical fiber 1602 may be qubit and/or quantum state of light interconnects and may be used to send photons, qubits, or entangled states of qubits into or out of PIC die 1610.

Figure 16B:
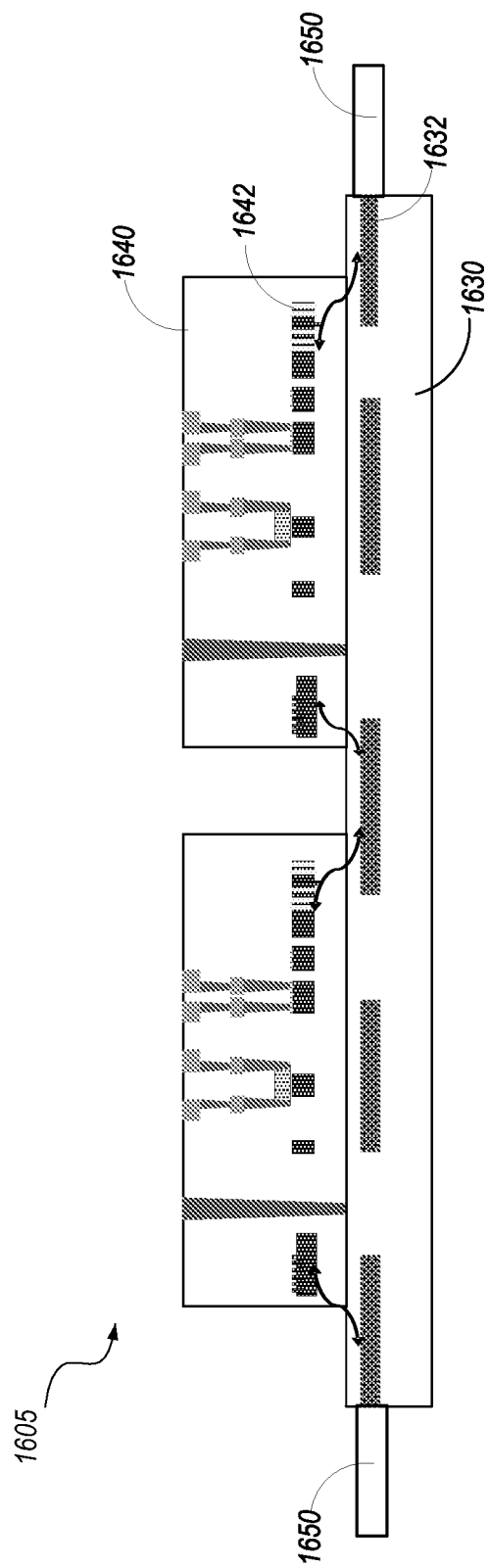

FIG. 16B illustrates an example of a structure 1605 including multiple PIC dies 1640 (and the corresponding EIC dies, not shown in FIG. 16B) that are bonded to and are optically coupled together via an optical backplane 1630 according to certain embodiments. Optical backplane 1630 may be used as an optical interposer and may include, for example, a silicon wafer with a silicon dioxide layer formed thereon. One or more waveguide layers, such as silicon, silicon nitride (SiN), or other waveguide layers of various thicknesses, may be formed in the silicon dioxide layer. The one or more waveguide layers may include waveguides 1632, which may be low-loss waveguides. In some embodiments, waveguides 1632 may be used as delay lines.

One or more optical fibers 1650 may be coupled to waveguides 1632 through, for example, edge couplers or tapered structures (e.g., an adiabatically tapered structure), such that light may be coupled from optical fibers 1650 to waveguides 1632 or from waveguides 1632 to optical fibers 1650. PIC dies 1640 may include photonic integrated circuits as described above and below. For example, PIC dies 1640 may include waveguide couplers 1642. Waveguide couplers 1642 can be any type of waveguide coupler, such as adiabatic and/or evanescent waveguide couplers. As used herein, the term adiabatic refers to an optical element (e.g., a coupler or a bend) that has the property that as the fundamental mode propagates through the optical element, the excitation of higher order modes, radiative modes, back reflection modes, and the like, are reduced or suppressed, thereby reducing optical loss. In embodiments where a qubit is implemented using a pair of waveguides, the waveguide couplers may include pairs of adiabatic and/or evanescent waveguide couplers for coupling qubits or other entangled states of qubits. Light propagating in waveguides 1632 may be coupled into waveguides in PIC dies 1640 by waveguide couplers 1642. Some waveguide couplers 1642 may be used to couple light from PIC dies 1640 into waveguides 1632 in optical backplane 1630. In this way, photons may propagate, via waveguides 1632, from optical fibers 1650 to PIC dies 1640, from one PIC die 1640 to another PIC die 1640, and/or from PIC dies 1640 to optical fibers 1650.

Figure 17A:
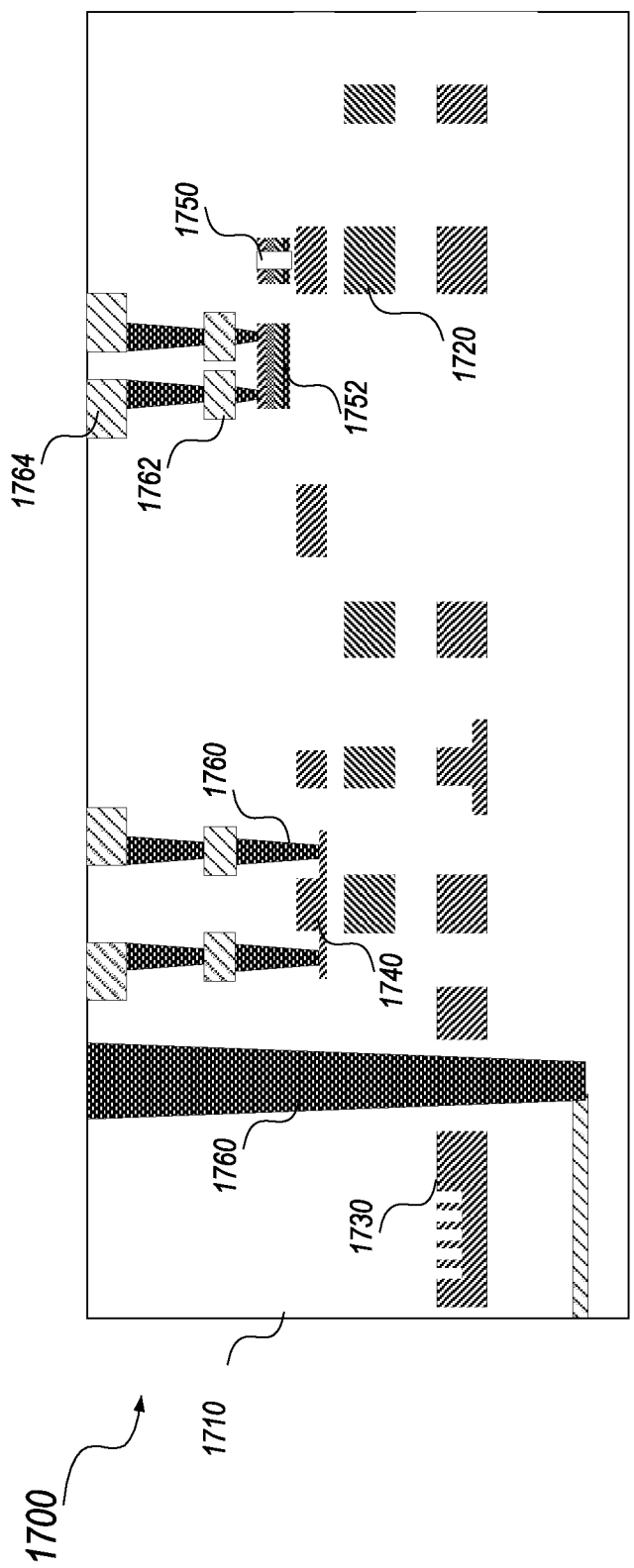
FIG. 17A-17B illustrates an example PIC dies and optical backplane, in accordance with some example embodiments.

FIG. 17A illustrates an example of a PIC die 1700 in an EPIC die stack according to certain embodiments. PIC die 1700 may include a dielectric material layer 1710 (e.g., a $SiO_2$ layer) that may be formed in multiple process steps. Photonic integrated circuits may be fabricated during these process steps. For example, a first silicon nitride ("SiN") layer may be deposited on a first dielectric layer and may be patterned by, for example, an etch step. A second dielectric layer may then be deposited on the patterned first SiN layer to form a first SiN waveguide layer, where the first and second dielectric layers may be the cladding layers for the first SiN waveguide layer. A second SiN layer may be deposited on the second dielectric layer and may then be patterned. A third dielectric layer may be deposited on the patterned second SiN layer to form a second SiN waveguide layer, where the second and third dielectric layers may be the cladding layers for the second SiN waveguide layer. Other photonic integrated circuits may also be formed in similar additive fabrication processes that may include material deposition and patterning (e.g., etching), followed by additional deposition and/or patterning.

In the example illustrated in FIG. 17A, the photonic integrated circuits formed in dielectric material layer 1710 may include, for example, one or more waveguide layers 1720, a grating coupler 1730, a switch 1740 (e.g., a piezoelectric switch, such as a lead zirconate titanate (PZT) switch), a single photon detector 1750 (e.g., an SNSPD) that includes a contact region 1752, and the like. The waveguide layers may be used to form, for example, routing waveguides, delay lines, waveguide pairs for implementing and transporting qubits and resource states, micro-ring resonators for generating photon pairs, switches, couplers, beam splitters (or other mode couplers), fusion gates, and the like. Metal layers 1762 and metal vias 1760 may also be formed in dielectric material layer 1710 to make electrical connections with active photonic integrated circuits such as switches and single photon detectors. Bonding pads 1764 may be formed at the top surface of PIC die 1700. In some embodiments, metal vias 1760 or trenches may be formed in dielectric material layer 1710 to provide optical isolation for some photonic integrated circuits, such as grating coupler 1730 and/or single photon detector 1750.

Figure 17B:
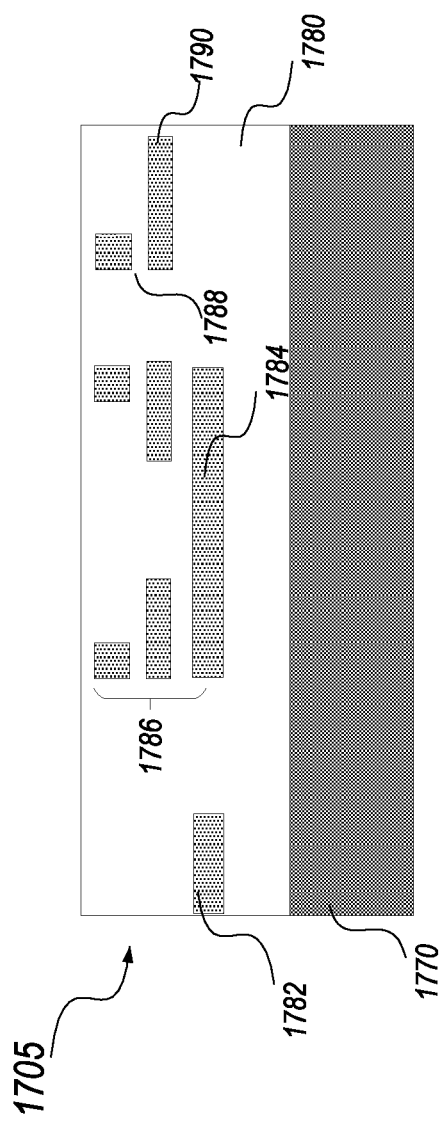

FIG. 17B illustrates a portion of an example of an optical backplane 1705 according to certain embodiments. In the illustrated example, optical backplane 1705 may include a substrate 1770 (e.g., a silicon wafer) and dielectric layers 1780. Dielectric layers 1780 may include various passive photonic integrated circuits formed therein. The passive photonic integrated circuits may include, for example, a coupler 1722 for coupling light from an optical fiber into optical backplane 1705, a waveguide layer 1784 (e.g., a SiN layer) that may include low-loss delay lines, a PIC-to-delay line coupler 1786, a PIC-to-PIC coupler 1788, routing waveguides 1790, and the like. Coupler 1782 may include a low-loss coupler, such as a tapered structure or a subwavelength grating. The low-loss delay lines may be used to provide various delays, such as about 10-100 ps, about or greater than 1 ns, about 50 ns, or longer. In some embodiments, the low-loss delay lines in waveguide layer 1744 and routing waveguides 1790 may include pairs of waveguides for qubit interconnects. In some embodiments, optical backplane 1705 may also include devices for dispersion compensation, polarization splitter/rotator, and the like. In some embodiments, optical backplane 1705 may also include thermal isolation structures and/or scattering mitigation structures. In some embodiments, optical backplane 1705 may also include phase shifters or phase stabilization circuits to improve the stability of qubits or entangled states of qubits propagating in qubit optical interconnects.

Figure 18:
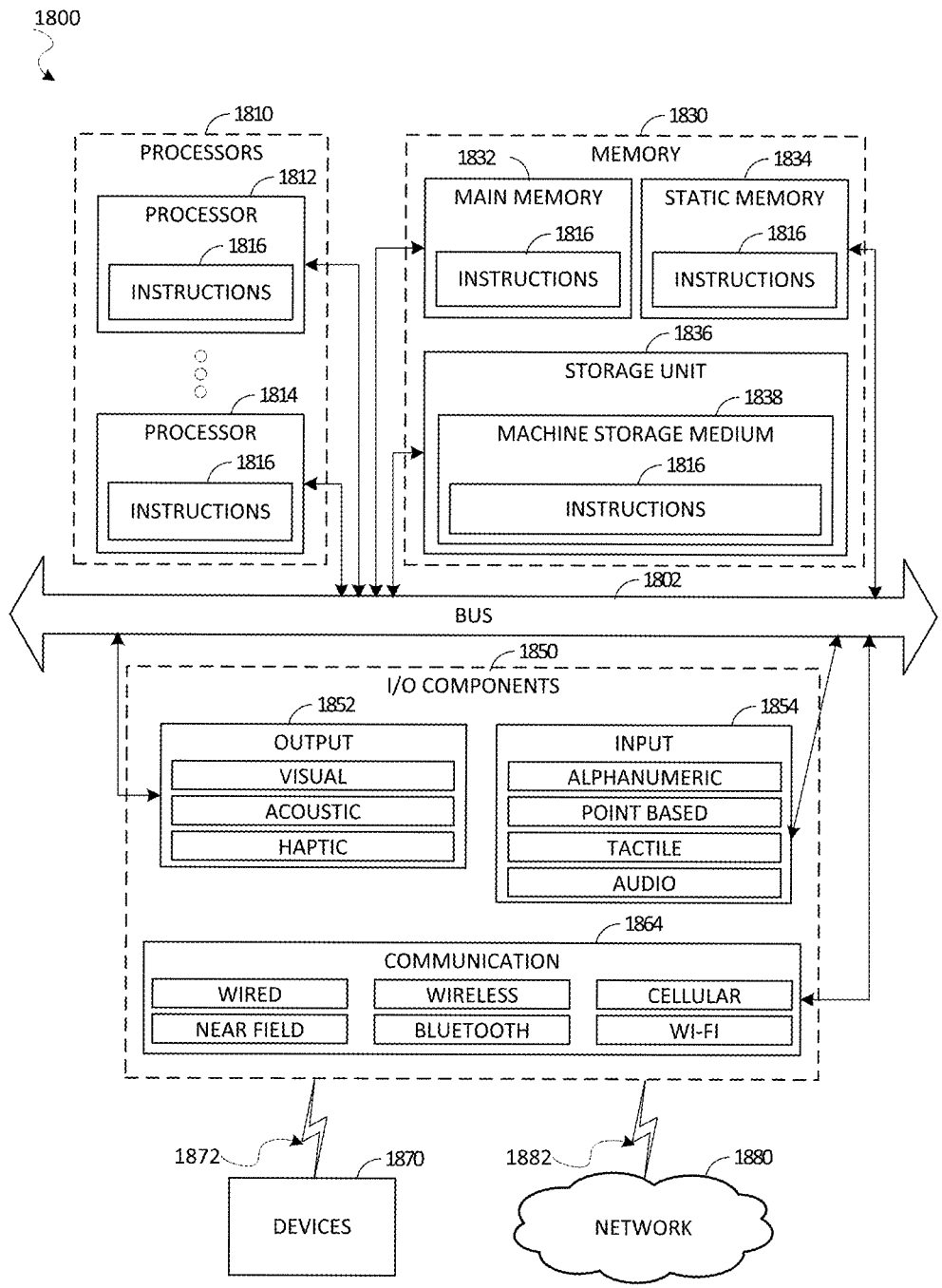
FIG. 18 illustrates a diagrammatic representation of a machine (e.g., cascade control console, local replication node microcontroller), in accordance with some example embodiments.

FIG. 18 illustrates a diagrammatic representation of a machine 1800 in the form of a computer system within which a set of instructions may be executed for causing the machine 1800 to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example, the instructions 1816 may cause the machine 1800 to execute any one or more operations of methods 800, 900 and/or 1000. In this way, the instructions 1816 transform a general, non-programmed machine into a particular machine 1800 (e.g., cascade control console 105, or an electronic control module 540 in a replication node) that is specially configured to carry out any one of the described and illustrated functions in the manner described herein.

In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 includes processors 1810, memory 1830, and input/output (I/O) components 1850 configured to communicate with each other such as via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1812 and a processor 1814 that may execute the instructions 1816. The term "processor" is intended to include multi-core processors 1810 that may comprise two or more independent processors (sometimes referred to as "cores") that may execute instructions 1816 contemporaneously. Although FIG. 18 shows multiple processors 1810, the machine 1800 may include a single processor with a single core, a single processor with multiple cores (e.g., a multi-core processor), multiple processors with a single core, multiple processors with multiple cores, or any combination thereof.

The memory 1830 may include a main memory 1832, a static memory 1834, and a storage unit 1836, all accessible to the processors 1810 such as via the bus 1802. The main memory 1832, the static memory 1834, and the storage unit 1836 store the instructions 1816 embodying any one or more of the methodologies or functions described herein. The instructions 1816 may also reside, completely or partially, within the main memory 1832, within the static memory 1834, within machine storage medium 1838 of the storage unit 1836, within at least one of the processors 1810 (e.g., within the processor's cache memory), or any suitable combination thereof, during execution thereof by the machine 1800.

The I/O components 1850 include components to receive input, provide output, produce output, transmit information, exchange information, capture measurements, and so on. The specific I/O components 1850 that are included in a particular machine 1800 will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or another suitable device to interface with the network 1880. In further examples, the communication components 1864 may include wired communication components, wireless communication components, cellular communication components, and other communication components to provide communication via other modalities. The devices 1870 may be another machine or any of a wide variety of peripheral devices (e.g., a peripheral device coupled via a universal serial bus (USB)). For example, as noted above, the machine 1800 may correspond to any one of the computer service manager or the execution platform, and the devices 1870 may include the client device or any other computing device described herein as being in communication with the network-based database system or the cloud storage platform.

The various memories (e.g., 1830, 1832, 1834, and/or memory of the processor(s) 1810 and/or the storage unit 1836) may store one or more sets of instructions 1816 and data structures (e.g., software) embodying or utilized by any one or more of the methodologies or functions described herein. These instructions 1816, when executed by the processor(s) 1810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., hypertext transfer protocol (HTTP)). Similarly, the instructions 1816 may be transmitted or received using a transmission medium via the coupling 1872 (e.g., a peer-to-peer coupling) to the devices 1870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1816 for execution by the machine 1800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Described implementations of the subject matter can include one or more features, alone or in combination as illustrated below by way of example. The following are examples:

Example 1: A method comprising: generating a plurality of optical pulses from a laser; shaping an optical pulse of the plurality of optical pulses to form a shaped optical pulse, the shaped optical pulse shaped to undergo conversion to an entangled pair of photons in a non-deterministic photon pair source; coupling the shaped optical pulse to a cascaded arrangement of a plurality of amplifying optical splitters; generating, on the cascaded arrangement of a plurality of amplifying optical splitters, a plurality of replicated shaped optical pulses from the shaped optical pulse; and outputting the plurality of replicated shaped optical pulses from the cascaded arrangement of a plurality of amplifying optical splitters.

Example 2: The method of Example 1, wherein the cascaded arrangement of the plurality of amplifying splitters comprises an increasing hierarchy of levels of amplifying splitters.

Example 3: The method of Example 1 or Example 2, wherein the increasing hierarchy of levels of amplifying splitters comprises a first level of amplifying splitters that output to a second level of amplifying splitters, the second level of amplifying splitters comprising at least an order of magnitude more amplifying splitters than the first level of amplifying splitters.

Example 4: The method of any one of Examples 1-3, wherein the increasing hierarchy of levels of amplifying splitters comprises eight levels of splitters that generate 200,000 or more replicated optical shaped pulses.

Example 5: The method of any one of Examples 1-4, further comprising: generating entangled states by entangling the plurality of replicated shaped optical pulses using a plurality of entanglement photonic integrated circuits.

Example 6: The method of any one of Examples 1-5, wherein an amplifying optical splitter comprises a plurality of optical tuning arms, wherein an optical tuning arm comprises an optical delay, an optical amplifier, and a variable optical attenuator.

Example 7: The method of any one of Examples 1-6, wherein each of the plurality of amplifying optical splitters are connected by optical interconnects, wherein lengths of the optical interconnects are configured to maintain a synchronized timing of the replicated shaped optical pulses throughout the cascaded arrangement of the plurality of amplifying splitters such that the replicated shaped optical pulses are output and received by a plurality of entanglement photonic integrated circuits.

Example 8: The method of any one of Examples 1-7, wherein the non-deterministic photon pair source comprises a four wave mixing source that generates the entangled pair of photons by propagating the shaped optical pulse in a non-linear medium.

Example 9: The method of any one of Examples 1-8, wherein the non-linear medium comprises at least one of: silicon or silicon nitride.

Example 10: The method of any one of Examples 1-9, wherein the entangled pair of photons comprises a signal photon and an idler photon.

Example 11: The method of any one of Examples 1-10, wherein idler photons that are generated from different non-deterministic photon pair sources processing shaped optical pulses are identical photons.

Example 12: The method of any one of Examples 1-11, wherein the identical photons are received by an entanglement photonic integrated circuit that generates photonic qubits from entanglement of the identical photons.

Example 13: The method of any one of Examples 1-12, wherein an amplifying optical splitter of the plurality of amplifying optical splitters forms an amplified shaped pulse using an optical amplifier.

Example 14: The method of any one of Examples 1-13, wherein the amplifying optical splitter comprises an optical splitter to split the amplified shaped pulse to form copied shaped pulses.

Example 15: The method of any one of Examples 1-14, wherein the amplifying optical splitter comprises a plurality of optical tuning arms to tune the copied shaped pulses to form replicated shaped optical pulses that are replicas of the shaped optical pulse, wherein the shaped optical pulse is coupled to the cascaded arrangement of the plurality of amplifying splitters using a plurality of interconnects.

Example 16: The method of any one of Examples 1-15, wherein the plurality of interconnects comprises a plurality of fibers.

Example 17: The method of any one of Examples 1-16, wherein the plurality of interconnects comprises a plurality of waveguides.

Example 18: The method of any one of Examples 1-17, wherein the optical amplifier comprises a fiber-based optical amplifier.

Example 19: The method of any one of Examples 1-18, wherein the fiber-based optical amplifier comprises at least one of: an erbium or yttrium fiber-based optical amplifier.

Example 20: The method of any one of Examples 1-19, wherein the fiber-based optical amplifier operates at saturation to compensate for noise of the cascaded arrangement.

Example 21: An optical amplifier/splitter module, comprising: an input channel configured to receive an input optical signal; an optical pre-amplifier configured to amplify the input optical signal to generate an amplified input signal; an n-way beam splitter configured to receive the amplified input signal and to generate n copies of the amplified input signal, wherein n is an integer greater than 1; n optical tailoring modules configured to receive the respective n copies of the amplified input signal to generate n output signals; and n output channels configured to provide the n output signals as output from the optical amplifier/splitter module to at least one heralded single photon source.

Example 22: The optical amplifier/splitter module of Example 21, wherein each optical tailoring module comprises: an optical delay line; an optical amplifier; and a variable optical attenuator.

Example 23: The optical amplifier/splitter module of Example 21 or Example 22, further comprising a first optical power monitor tap configured to measure an optical power of the amplified input optical signal.

Example 24: The optical amplifier/splitter module of any one of Examples 21-23, wherein each optical tailoring module further comprises an optical filter and a second optical power monitor tap.

Example 25: The optical amplifier/splitter module of any one of Examples 21-24, further comprising a control electronics module optically connected to the first and the second optical power monitor tap, the control electronics module comprising: a delay controller configured to control the optical delay line; an amplifier controller configured to control the optical amplifier; an attenuator controller configured to control the variable optical attenuator; and an optical power monitor configured to receive a power signal from the second optical power monitor tap.

Example 26: The optical amplifier/splitter module of any one of Examples 21-25, wherein the control electronics module further comprises an ethernet interface configured to be coupled to a remote monitoring and control system such that the remote monitoring and control system may control the control electronics module.

Example 27: A cascaded optical network, comprising: a pump laser source; a network input channel configured to receive an input optical signal from the pump laser source; a plurality of n-way amplifier/splitter modules of any one of Examples 21-26 configured in m stages to generate $n^m$ output optical signals from the single input optical signal, wherein each of $n^j$ output optical signals in a given j'th stage are fed as input to $n^j$ amplifier/splitter modules in a (j+1)'th stage, wherein n and m are each integers greater than 1 and j ranges from 1 to m; $n^m$ output channels that are configured to provide the $n^m$ output signals as output from the cascaded network of amplifier/splitter modules; and a plurality of heralded single photon sources configured to receive the $n^m$ output optical signals from the n-way amplifier/splitter modules in the m'th stage.

Example 28: A cascaded optical network, comprising: a pump laser source; a network input channel configured to receive an input optical signal from the pump laser source; a plurality of n-way amplifier/splitter modules configured in m stages to generate $n^m$ output optical signals from the single input optical signal, wherein each of $n^j$ output optical signals in a given j'th stage are fed as input to $n^j$ amplifier/splitter modules in a (j+1)'th stage, wherein n and m are each integers greater than 1 and j ranges from 1 to m; $n^m$ output channels that are configured to provide the $n^m$ output signals as output from the cascaded network of amplifier/splitter modules; and a plurality of heralded single photon sources configured to receive the $n^m$ output optical signals from the n-way amplifier/splitter modules in the m'th stage.

Example 29: The cascaded optical network of Example 28, wherein each of the n-way optical amplifier/splitter modules comprise: an input channel configured to receive an input optical signal; an optical pre-amplifier configured to amplify the input optical signal to generate an amplified input signal; a first optical power monitor tap configured to measure an optical power of the amplified input optical signal; an n-way beam splitter configured to receive the amplified input signal and to generate n copies of the amplified input signal; n optical tailoring modules configured to receive the respective n copies of the amplified input signal to generate n output signals; and n output channels configured to provide the n output signals as output from the optical amplifier/splitter module.

Example 30: The cascaded optical network of Example 28 or Example 29, wherein each optical tailoring module comprises: an optical delay line; an optical amplifier; a variable optical attenuator; and a second optical power monitor tap.

Example 31: The cascaded optical network of any one of Examples 28-30, wherein each optical tailoring module further comprises an optical filter.

Example 32: The cascaded optical network of any one of Examples 28-31, wherein each optical amplifier/splitter module further comprises a control electronics module comprising: a delay controller configured to control the optical delay line; an amplifier controller configured to control the second optical amplifier; an attenuator controller configured to control the variable optical attenuator; and an optical power monitor configured to receive a power signal from the second optical power monitor tap.

Example 33: The cascaded optical network of any one of Examples 28-32, wherein the control electronics module further comprises an ethernet interface configured to be coupled to a remote monitoring and control system such that the remote monitoring and control system may control the control electronics module.

Example 34: The cascaded optical network of any one of Examples 28-33, wherein the plurality of heralded single photon sources comprise portions of a quantum computer.

Example 35: A method, comprising: receiving an input optical signal by a cascaded network of amplifier/splitter modules; using a plurality of n-way amplifier/splitter modules in m stages to split the input signal into $n^m$ output optical signals, wherein each of a $n^j$ output optical signals in a given j'th stage are fed as input to $n^j$ amplifier/splitter modules in a (j+1)'th stage, wherein n and m are each integers greater than 1 and j ranges from 1 to m; and providing the $n^m$ output optical signals as output from the cascaded network of amplifier/splitter modules to a plurality of heralded single photon sources which receive the $n^m$ output optical signals from the n-way amplifier/splitter modules in the m'th stage.

Example 36: The method of Example 35, further comprising controlling properties of the optical signals within each amplifier/splitter module by: pre-amplifying an input optical signal to generate an amplified input signal; splitting the amplified input signal into n copies of the amplified input signal; modifying properties of the n copies of the amplified input signal using an optical tailoring module to generate n modified optical signals; and providing the n modified optical signals as output from the amplifier/splitter module.

Example 37: The method of Example 35 or Example 36, wherein generating the modified optical signal comprises: modifying a delay of each of the n copies of the amplified input signal; amplifying each of the n copies of the amplified input signal; and modifying an amplitude of each of the n copies of the amplified input signal.

Example 38: The method of any one of Examples 35-37, further comprising filtering each of the n copies of the amplified input signal.

Example 39: The method of any one of Examples 35-38, further comprising performing a quantum computing function using the heralded single photon sources.

Example 40: The method of any one of Examples 35-39, wherein the output optical signals from the n-way amplifier/splitter modules in the first stage to the (m−1) stage are provided to other ones of the n-way amplifier/splitter modules in a next higher numbered stage.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 800, 900, and 1000 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   generating a plurality of optical pulses from a laser;
   shaping an optical pulse of the plurality of optical pulses to form a shaped optical pulse, the shaped optical pulse shaped to compensate for optical distortion from replication in a cascaded arrangement of a plurality of amplifying optical splitters;
   coupling the shaped optical pulse to a cascaded arrangement of a plurality of amplifying optical splitters;
   generating, on the cascaded arrangement of a plurality of amplifying optical splitters, a plurality of replicated shaped optical pulses from the shaped optical pulse; and
   outputting the plurality of replicated shaped optical pulses from the cascaded arrangement of a plurality of amplifying optical splitters.

2. The method of claim 1, wherein the cascaded arrangement of the plurality of amplifying splitters comprises an increasing hierarchy of levels of amplifying splitters.

3. The method of claim 2, wherein the increasing hierarchy of levels of amplifying splitters comprises a first level of amplifying splitters that output to a second level of amplifying splitters, the second level of amplifying splitters comprising at least an order of magnitude more amplifying splitters than the first level of amplifying splitters.

4. The method of claim 2, wherein the optical distortion comprises optical dispersion from the cascaded arrangement of the plurality of amplifying optical splitters.

5. The method of of claim 2, wherein the shaped optical pulse is shaped such that the replicated pulses undergo conversion to entangled photon pairs in a plurality of non-deterministic photon pair photonic integrated circuits; wherein the method further comprises:
generating entangled states by entangling the plurality of replicated shaped optical pulses using a plurality of entanglement photonic integrated circuits.

6. The method of claim 1, wherein an amplifying optical splitter comprises a plurality of optical tuning arms, wherein an optical tuning arm comprises an optical delay, an optical amplifier, and a variable optical attenuator.

7. The method of claim 1, wherein each of the plurality of amplifying optical splitters are connected by optical interconnects, wherein lengths of the optical interconnects are configured to maintain a synchronized timing of the replicated shaped optical pulses throughout the cascaded arrangement of the plurality of amplifying splitters such that the replicated shaped optical pulses are output and received by a plurality of entanglement photonic integrated circuits.

8. The method of claim 1, wherein the non-deterministic photon pair source comprises a four wave mixing source that generates the entangled pair of photons by propagating the shaped optical pulse in a non-linear medium.

9. The method of claim 8, wherein the non-linear medium comprises at least one of: silicon or silicon nitride.

10. The method of claim 8, wherein the entangled pair of photons comprises a signal photon and an idler photon.

11. The method of claim 8, wherein idler photons that are generated from different non-deterministic photon pair sources processing shaped optical pulses are identical photons.

12. The method of claim 11, wherein the identical photons are received by an entanglement photonic integrated circuit that generates photonic qubits from entanglement of the identical photons.

13. The method of claim 1, wherein an amplifying optical splitter of the plurality of amplifying optical splitters forms an amplified shaped pulse using an optical amplifier.

14. The method of claim 1, wherein the optical amplifier comprises a fiber-based optical amplifier.

15. The method of claim 14, wherein the fiber-based optical amplifier comprises at least one of an erbium or yttrium fiber-based optical amplifier.

16. The method of claim 15, wherein the fiber-based optical amplifier operates at saturation to compensate for noise of the cascaded arrangement.

17. The method of claim 13, wherein the amplifying optical splitter comprises an optical splitter to split the amplified shaped pulse to form copied shaped pulses.

18. The method of claim 17, wherein the amplifying optical splitter comprises a plurality of optical tuning arms to tune the copied shaped pulses to form replicated shaped optical pulses that are replicas of the shaped optical pulse, wherein the shaped optical pulse is coupled to the cascaded arrangement of the plurality of amplifying splitters using a plurality of interconnects.

19. The method of claim 18, wherein the plurality of interconnects comprises a plurality of fibers.

20. The method of claim 18, wherein the plurality of interconnects comprises a plurality of waveguides.

* * * * *